United States Patent
Sethi et al.

(10) Patent No.: US 12,248,693 B2
(45) Date of Patent: Mar. 11, 2025

(54) METHOD AND SYSTEM TO DETERMINE A SUITABLE MIGRATION ENVIRONMENT FOR APPLICATIONS IN A DISTRIBUTED ENVIRONMENT

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 18/070,577

(22) Filed: Nov. 29, 2022

(65) Prior Publication Data
US 2024/0176526 A1 May 30, 2024

(51) Int. Cl.
G06F 3/06 (2006.01)
(52) U.S. Cl.
CPC .......... *G06F 3/0647* (2013.01); *G06F 3/0604* (2013.01); *G06F 3/067* (2013.01)
(58) Field of Classification Search
None
See application file for complete search history.

(56) References Cited

U.S. PATENT DOCUMENTS

| | | |
|---|---|---|
| 6,105,035 A | 8/2000 | Monge |
| 6,195,760 B1 | 2/2001 | Chung et al. |
| 6,393,480 B1 | 5/2002 | Qin |
| 7,251,745 B2 | 7/2007 | Koch et al. |
| 7,401,248 B2 | 7/2008 | Nakahara et al. |
| 7,525,749 B2 | 4/2009 | Maejima et al. |
| 7,590,981 B2 | 9/2009 | Gupta et al. |
| 8,078,448 B1 | 12/2011 | Wohlberg et al. |

(Continued)

FOREIGN PATENT DOCUMENTS

WO 2017095382 A1 6/2017

OTHER PUBLICATIONS

Wu, Suzhen et al., Proactive Data Migration for Improved Storage Availability in Large-Scale Dat Centers, Sep. 2015, IEEE Transactions on Computers. vol. 64. No. 9 (15 pages).

*Primary Examiner* — Brian R Peugh
(74) *Attorney, Agent, or Firm* — Aly Z. Dossa; Chamberlain, Hrdlicka, White, Williams & Aughtry

(57) ABSTRACT

A method for managing application migration includes: inferring dependencies and connectivity among applications executing on a system; generating a target infrastructure node (IN) configuration template based on the inferred dependencies and connectivity; making a determination that a configuration of a target IN does not satisfy the template, in which an application is executing on an IN, in which the application is not executing on the target IN; in response to the determination: obtaining a weight for each inferred parameter in the template, in which the inferred parameters comprises the inferred dependencies and connectivity, in which the weight for each inferred parameter is configured by a user; executing, based on the weights, a model to obtain a deviation score for a second target IN; generating, based on the deviation score, a migration recommendation specifying the second target IN; and initiating a display of the migration recommendation to the user.

20 Claims, 9 Drawing Sheets

(56) References Cited

U.S. PATENT DOCUMENTS

| | | |
|---|---|---|
| 8,364,799 B2 | 1/2013 | Sakai |
| 8,918,673 B1 | 12/2014 | Rangaiah et al. |
| 9,015,832 B1 | 4/2015 | Lachwani et al. |
| 9,417,918 B2 | 8/2016 | Chin |
| 9,514,164 B1 | 12/2016 | Matic |
| 10,303,465 B1 | 5/2019 | Potter |
| 11,392,402 B1 | 7/2022 | Carroll |
| 11,595,269 B1 | 2/2023 | Ghosh et al. |
| 11,846,918 B1 | 12/2023 | Mazur |
| 2003/0233230 A1 | 12/2003 | Ammicht |
| 2005/0216800 A1 | 9/2005 | Bicknell et al. |
| 2005/0257090 A1 | 11/2005 | Santos |
| 2006/0129771 A1 | 6/2006 | Dasgupta et al. |
| 2007/0079170 A1 | 4/2007 | Zimmer et al. |
| 2007/0198524 A1 | 8/2007 | Branda et al. |
| 2007/0198968 A1 | 8/2007 | Shenfield |
| 2008/0222218 A1 | 9/2008 | Richards et al. |
| 2009/0307522 A1 | 12/2009 | Olson et al. |
| 2010/0142447 A1* | 6/2010 | Schlicht ............... H04W 4/20 370/328 |
| 2011/0035755 A1 | 2/2011 | Huang |
| 2011/0087672 A1 | 4/2011 | Hui |
| 2011/0113224 A1 | 5/2011 | Isshiki et al. |
| 2011/0251998 A1 | 10/2011 | Moore |
| 2011/0307903 A1 | 12/2011 | Vaddagiri |
| 2012/0072571 A1 | 3/2012 | Orzell et al. |
| 2012/0089711 A1 | 4/2012 | Zager |
| 2012/0151061 A1 | 6/2012 | Bartfai-Walcott |
| 2012/0254849 A1 | 10/2012 | Wang |
| 2013/0103977 A1 | 4/2013 | Zimmermann |
| 2013/0346714 A1 | 12/2013 | Solihin |
| 2014/0172782 A1 | 6/2014 | Schuenzel |
| 2014/0376385 A1 | 12/2014 | Boss et al. |
| 2015/0169329 A1 | 6/2015 | Barrat |
| 2015/0222702 A1 | 8/2015 | Salle |
| 2015/0261518 A1 | 9/2015 | Viswanathan |
| 2015/0278219 A1 | 10/2015 | Phipps |
| 2015/0347573 A1 | 12/2015 | Hosokawa |
| 2016/0162280 A1 | 6/2016 | Murayama et al. |
| 2016/0239395 A1 | 8/2016 | Madsen et al. |
| 2016/0266875 A1 | 9/2016 | Takahashi |
| 2017/0337088 A1 | 11/2017 | Wang |
| 2018/0113728 A1 | 4/2018 | Musani et al. |
| 2018/0157723 A1 | 6/2018 | Chougule |
| 2018/0262979 A1 | 9/2018 | Wang et al. |
| 2018/0322276 A1 | 11/2018 | Brown |
| 2019/0104019 A1 | 4/2019 | Makovsky |
| 2019/0199687 A1 | 6/2019 | Lan |
| 2019/0310872 A1 | 10/2019 | Griffin |
| 2019/0311041 A1 | 10/2019 | Shah |
| 2020/0110655 A1 | 4/2020 | Harwood et al. |
| 2020/0133772 A1 | 4/2020 | Dalmatov et al. |
| 2020/0156243 A1 | 5/2020 | Ghare et al. |
| 2020/0264930 A1 | 8/2020 | Mandagere et al. |
| 2020/0349238 A1 | 11/2020 | Tyagi |
| 2020/0351900 A1* | 11/2020 | Zhang ............... H04W 4/029 |
| 2021/0165768 A1 | 6/2021 | D'halluin et al. |
| 2021/0200814 A1 | 7/2021 | Tal |
| 2021/0373947 A1 | 12/2021 | Kweon |
| 2022/0075613 A1 | 3/2022 | Ramachandran |
| 2022/0164186 A1 | 5/2022 | Pamidala |
| 2022/0171856 A1 | 6/2022 | Bhatt |
| 2022/0179683 A1 | 6/2022 | Verma et al. |
| 2023/0037124 A1 | 2/2023 | Mengwasser et al. |
| 2023/0080047 A1 | 3/2023 | Bashir |
| 2023/0229625 A1 | 7/2023 | Nerurkar |

\* cited by examiner

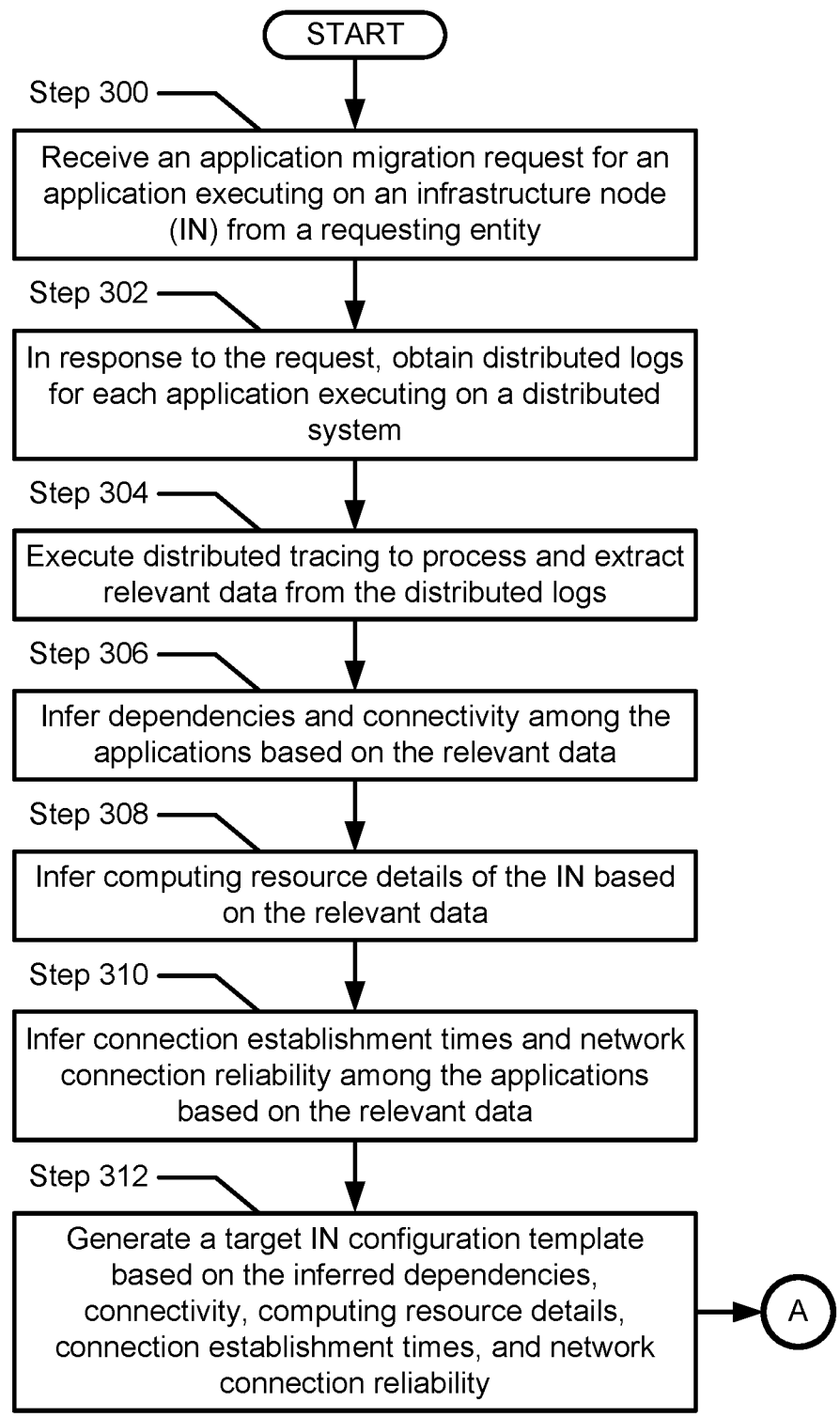
FIG. 3.1

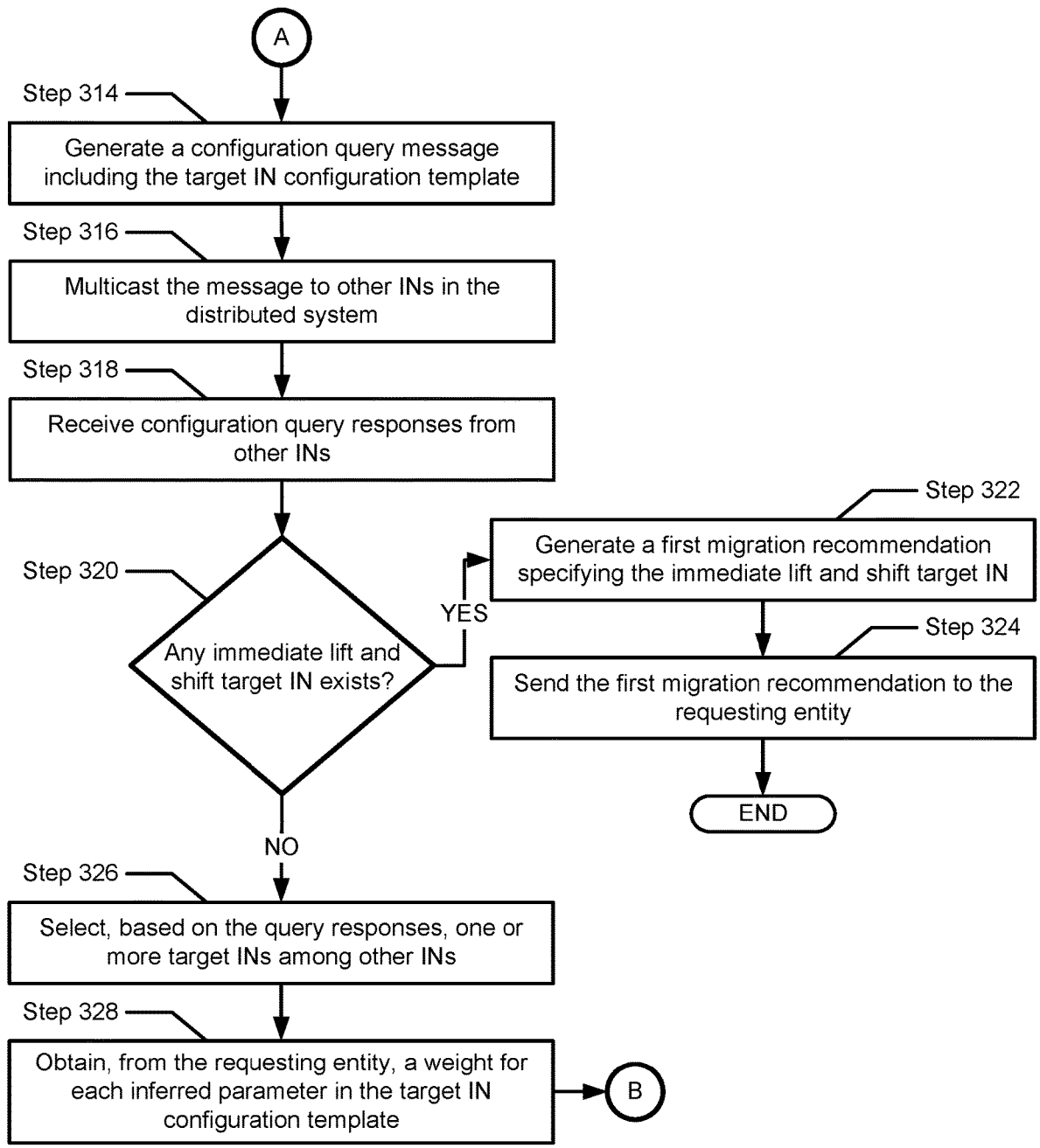
FIG. 3.2

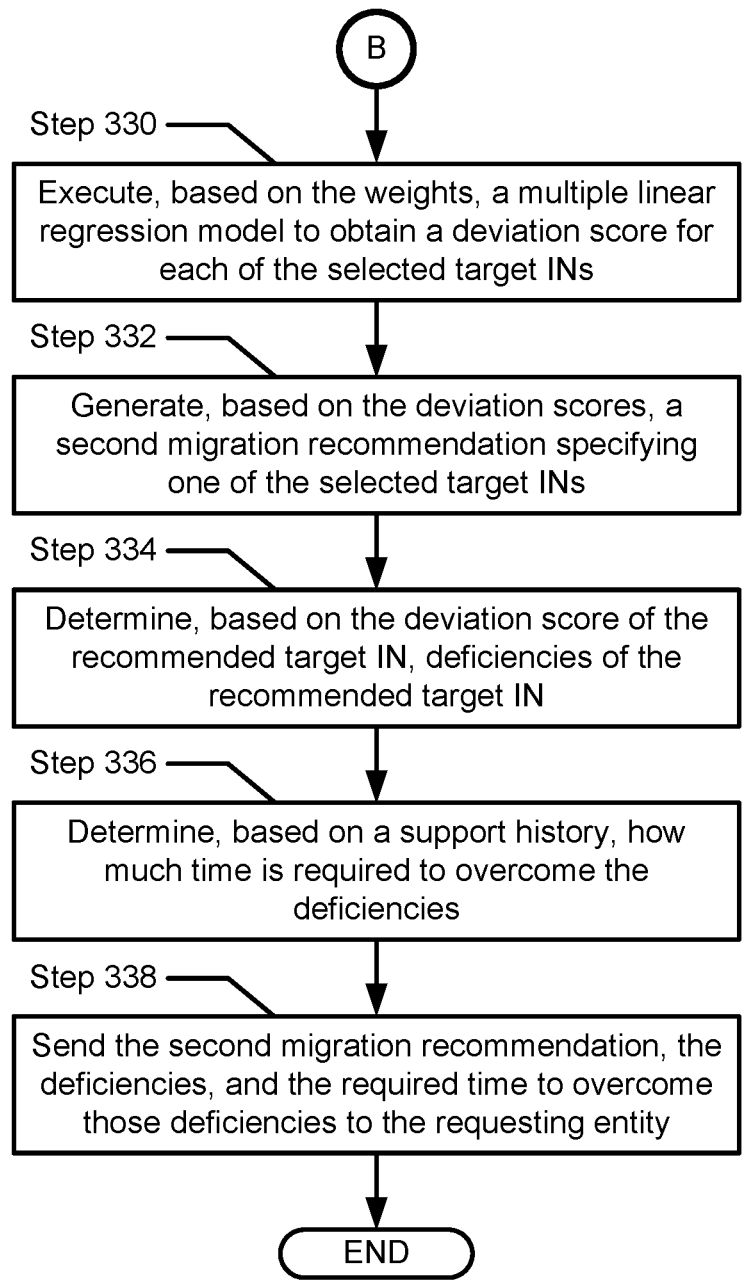
FIG. 3.3

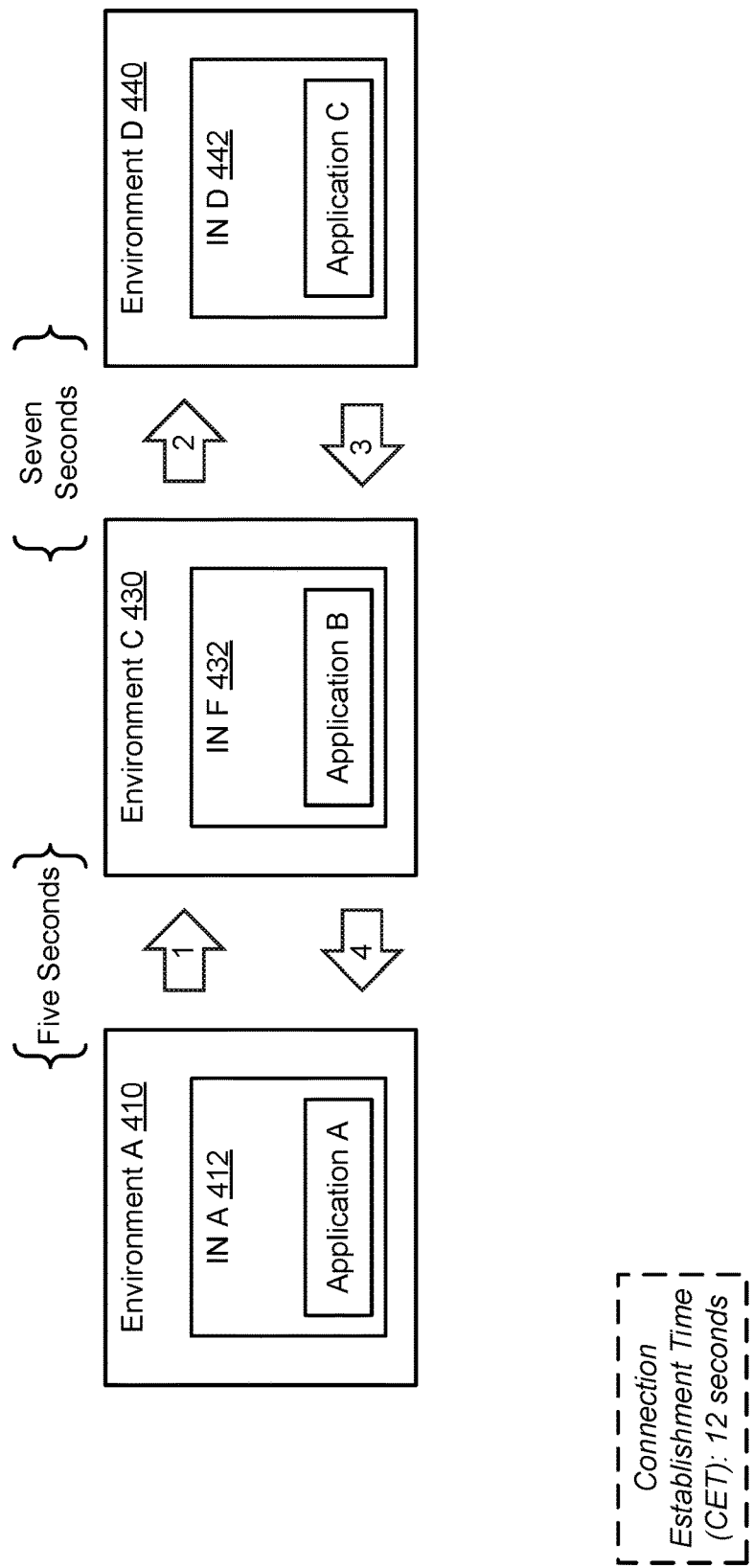
FIG. 4.1

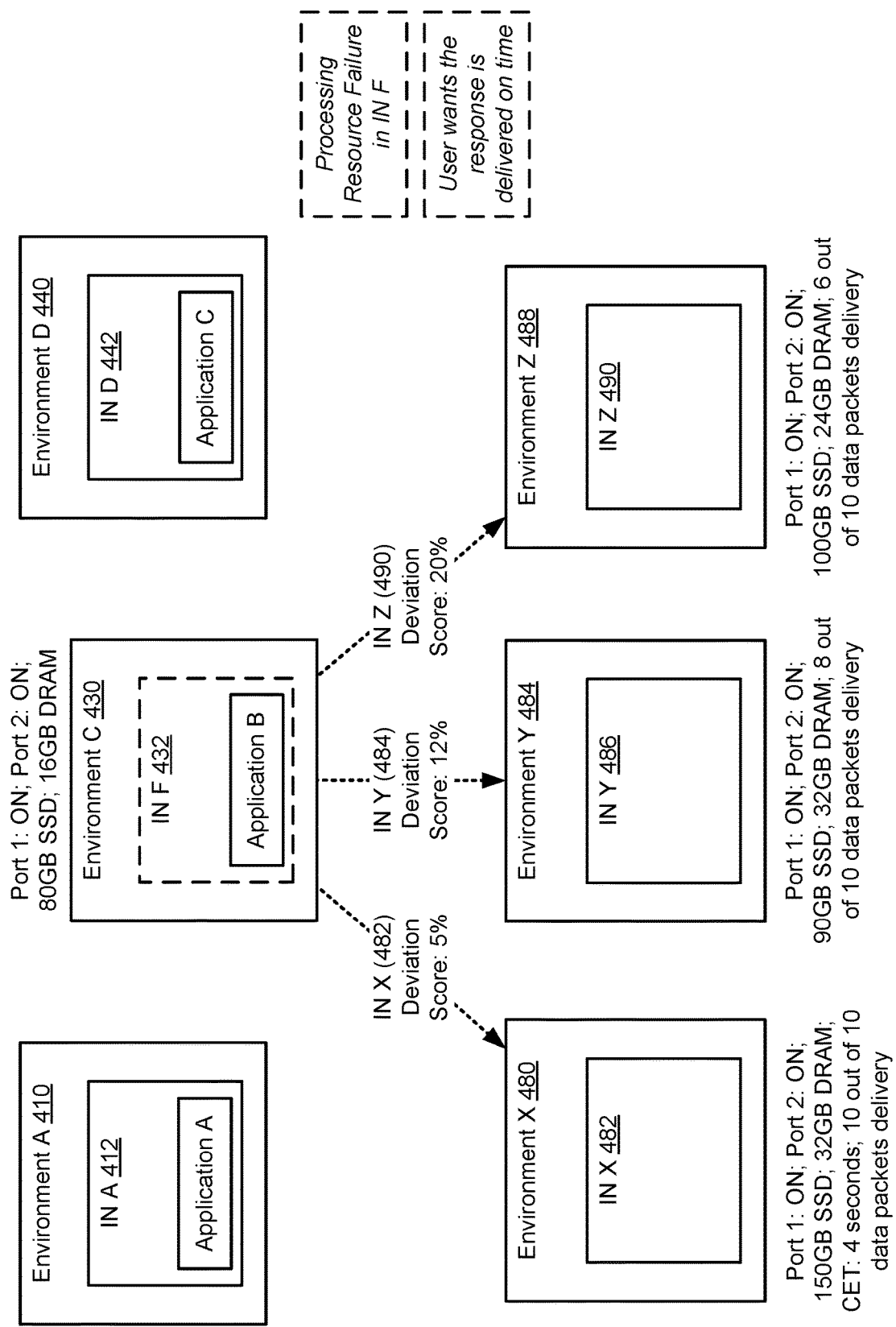
FIG. 4.2

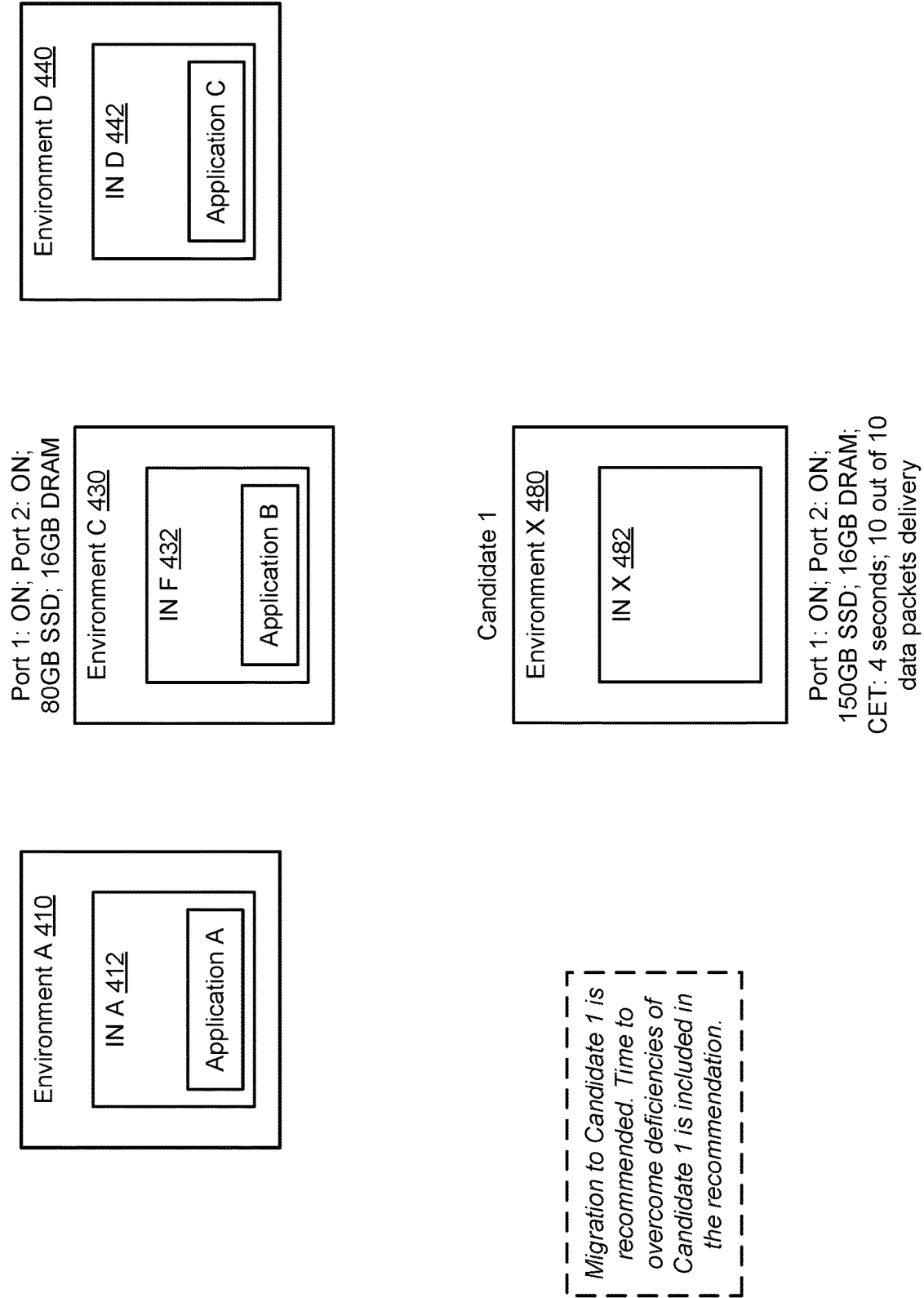
FIG. 4.3

METHOD AND SYSTEM TO DETERMINE A SUITABLE MIGRATION ENVIRONMENT FOR APPLICATIONS IN A DISTRIBUTED ENVIRONMENT

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for determining a suitable migration environment to migrate an application in accordance with one or more embodiments of the invention.

FIGS. 4.1-4.3 show a diagram of an example system while generating a migration recommendation in accordance with one or more embodiments of the invention.

DETAILED DESCRIPTION

Figure 1:
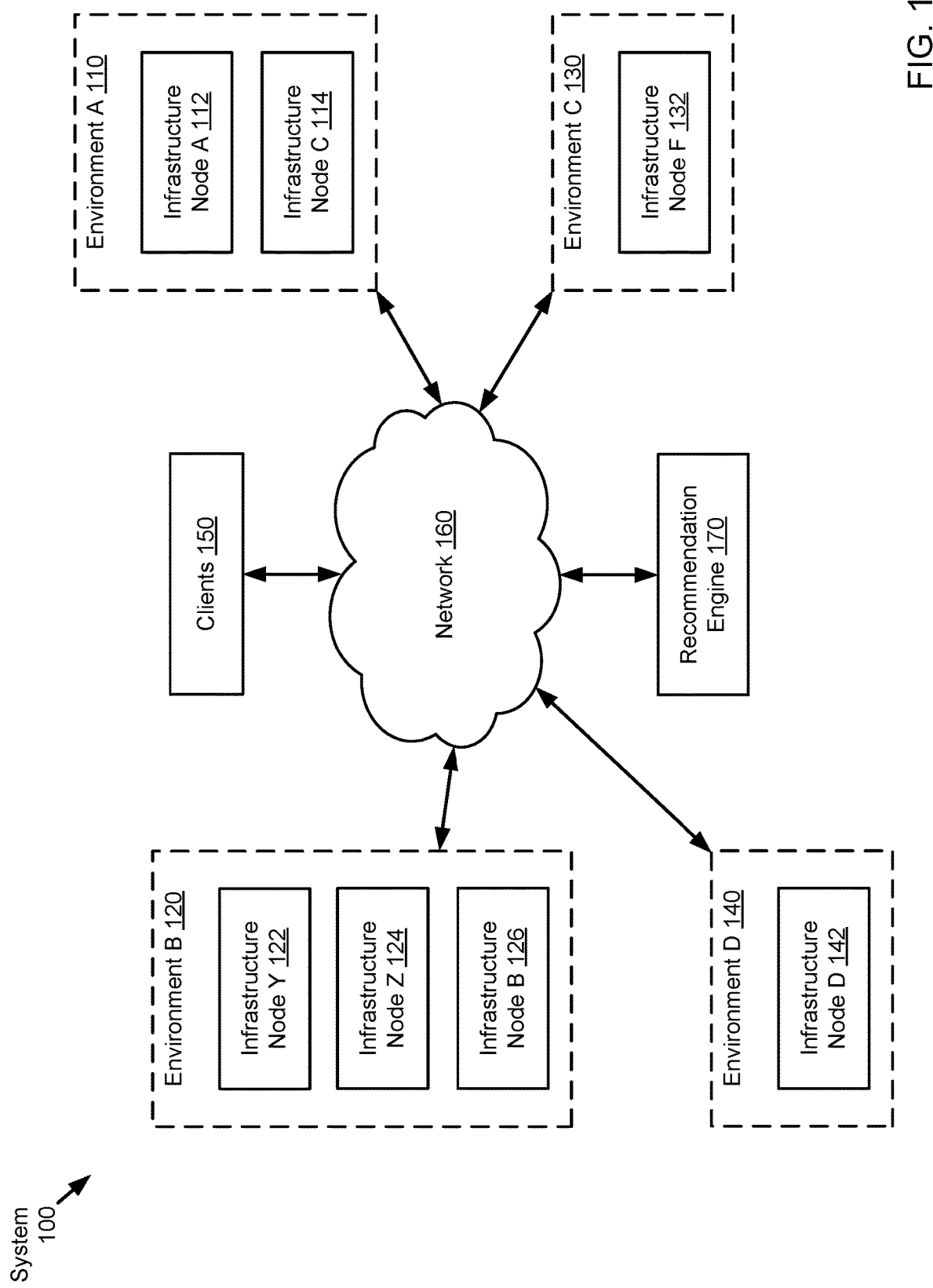
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, when a user of a client needs to migrate an application from a current infrastructure node (IN) (e.g., a source IN) to another IN (e.g., a target IN) because of an issue (e.g., a hardware issue, a licensing issue, a cost issue, etc.) occurred in the source IN, the user may not be aware of whether the target IN is a suitable migration environment. Typically, as a result of not being aware of the suitable migration environment, the client may lose data associated with the application.

Embodiments of the invention relate to methods and systems to determine a suitable migration environment using distributed logs. More specifically, various embodiments of the invention may infer dependencies and connectivity among applications executing on a distributed system, in which the applications are operatively connected through a network. Based on the inferred dependencies and connectivity, a target IN configuration template may be generated. A determination may then be made, in which the determination specifies that a configuration of a target IN does not satisfy the target IN configuration template, in which (i) an application is executing on an IN and (ii) the application is not executing on the target IN, and (iii) the distributed system includes the IN and the target IN. In response to the determination, a weight for each inferred parameter in the target IN configuration template may be obtained. Based on the weights, a model may be executed to obtain a deviation score for a second target IN. Thereafter, based on the deviation score, a migration recommendation (specifying the second target IN) may be generated. A display of the migration recommendation may then be initiated (e.g., instantiated, executed, etc.) to the user. As a result of the processes discussed below, one or more embodiments disclosed herein advantageously ensure that the user is aware of which target IN is the suitable migration environment. In this manner, the user may not lose data associated with the application.

The following describes various embodiments of the invention.

FIG. 1 shows a diagram of a system (100) in accordance with one or more embodiments of the invention. The system (100) includes any number of environments (e.g., Environment A (110), Environment B (120), Environment C (130), Environment D (140), etc.), any number of clients (150), a network (160), and a recommendation engine (170). The system (100) may include additional, fewer, and/or different components without departing from scope of the invention. Each component may be operably connected to any of the other components via any combination of wired and/or wireless connections. Each component illustrated in FIG. 1 is discussed below.

While FIG. 1 shows a specific configuration of the system (100), other configurations may be used without departing from the scope of the disclosure. For example, although the clients (150) and the environments (e.g., 110, 120, etc.) are shown to be operatively connected through the network (160), the clients (150) and the environments (e.g., 110, 120, etc.) may be directly connected, without an intervening network (e.g., 160). Further, the functioning of the clients (150) and the environments (e.g., 110, 120, etc.) is not dependent upon the functioning and/or existence of the other device(s) in the system (100). Rather, the clients (100) and the environments (e.g., 110, 120, etc.) may function independently, and perform operations locally that do not require communication with other devices. Accordingly, embodiments disclosed herein should not be limited to the configuration of devices and/or components shown in FIG. 1.

In one or more embodiments, the system (100) may represent a distributed system (e.g., a distributed computing environment, a cloud computing infrastructure, etc.) that delivers computing power and storage capacity as a service to users of the clients (150) via the network (160). The system (100) may also represent a comprehensive middleware layer running on computing devices (e.g., 500, FIG. 5) which supports virtualized application environments. In one or more embodiments, the system (100) may support a virtual machine (VM) environment, and may map capacity requirements (e.g., computational load, storage access, etc.) of VMs and supported applications to available resources (e.g., processing resources, storage resources, etc.) managed by the environments (e.g., 110, 120).

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "distributed system" is a computing environment in which various components (e.g., IN A (112), IN F (132), etc.) are spread across multiple environments (e.g., 110, 120) on a network (e.g., 160). The distributed system may be configured for workload placement collaboration and computing resource (e.g., processing, storage/memory, virtualization, networking, etc.) exchange.

In one or more embodiments, the INs (e.g., 112, 132, etc.) may be directed to hosting and maintaining various workloads. For example, the INs (e.g., 112, 132, etc.) may split up a request (e.g., an operation, a task, an activity, etc.), coordinating their efforts to complete the request (e.g., to generate a response) more efficiently than if a single IN had been responsible for completing the request. Further, depending on user requirements, the system (100) may be configured to satisfy the user requirements. In this manner, there may be different types (e.g., models, architectures, etc.) of distributed systems, for example (but not limited to): client-server distributed systems, telecommunications networks, peer-to-peer networks, graphical and video-rendering systems, scientific computing (e.g., protein folding) systems, airline reservation systems, multiplayer video games, global supply chain management systems, etc.

As being a conventional type of distributed system, a "client-server distributed system" includes a multitude of networked INs that interacts with a main server to provide at least data storage and/or computer-implemented services (discussed below). Further, a "telecommunication network" is an advance type of distributed system, in which the network distributes workloads among handsets, switching systems, and internet-based components to handle. In a "peer-to-peer network architecture", workloads are distributed among hundreds or thousands of INs executing the same software (e.g., code, instructions, program, etc.).

Distributed systems may offer various advantages (e.g., features, characteristics, etc.) over conventional computing environments, for example (but not limited to): a reduced risk of a single point of failure, an improved reliability while completing a request, a higher processing-related fault tolerance, an ability to complete a request in a shorter period of time, scalability over time, heterogeneity, concurrency, transparency, etc. For example, an ability to scale as the size of a workload increases is an essential characteristic of distributed systems, achieved by adding additional INs (e.g., 112, 132, etc.) to the network (160) as needed.

As yet another example, with the help of the fault tolerance characteristic, if one of the INs fails, the remaining INs may continue to operate without disrupting an overall computation. As yet another example, with the help of the transparency characteristic, a user of a distributed system may perceive the system as a single computational system, allowing the user to interact with a single logical device rather than being concerned with the system's infrastructure. The aforementioned examples are not intended to limit the scope of the invention.

As an example use case, a user of the clients (150) may send a task (e.g., rendering a video) to a distribution engine (not shown) of the system (100) that manages/distributes incoming tasks to available INs (e.g., 112, 132, etc.). After receiving the task, the distribution engine splits the task into pieces and provides one of the pieces (e.g., one frame of the video) to each of the INs (e.g., 112, 132, etc.) to complete the rendering. Once the frame is complete, the distribution engine provides another frame to each of the INs (e.g., 112, 132, etc.) and this process continues until the video is rendered (e.g., all pieces are put back together). In this manner, a complex task (like the video rendering task) may be completed in a matter of minutes as opposed to completing the task in days because of limited computing power of a single IN. The aforementioned example is not intended to limit the scope of the invention.

In one or more embodiments, the system (100) may include a distributed request tracing (also referred to herein as "distributed tracing") feature that helps to monitor applications (e.g., 210A, 210N, FIG. 2)—typically those built on a microservices architecture (discussed below)—that are commonly deployed on the system (100). Distributed tracing is a form of distributed computing to monitor operations of the applications (e.g., 210A, 210N, FIG. 2) executing on the system (100).

Mostly in software development and information technology (IT) operations, users employ a distributed tracing to track the course of a request (or a transaction) as it travels through an application that is being monitored. For example, by employing a distributed tracing, an online credit card transaction (as it paves its way from a customer's initial purchase to the verification and approval process to the completion of the transaction) may be monitored. In this manner, users may monitor a request (and its corresponding response) step by step to pinpoint bottlenecks, bugs, and other issues that may impact the application's performance. The aforementioned example is not intended to limit the scope of the invention.

A tracing is a fundamental process employed by users (along with other forms of logging) to gather data (e.g., information) about an application's behavior; however, a conventional tracing may generate problems when it is used to troubleshoot applications (e.g., 210A, 210N, FIG. 2) deployed on a distributed system (e.g., 100). In most cases, because microservices (e.g., applications, virtual services, etc.) scale independently, it is possible to have multiple iterations of a single service executing across different environments (e.g., servers) simultaneously, generating a complex path through which a request must travel. Without executing a distributed tracing, an application deployed on a microservices architecture and executing on a distributed system would be impossible to monitor with the conventional tracing designed for a single service application.

Further, in order to handle the considerable complexity of distributed systems, using a distributed tracing may be necessary because (i) it can track multiple applications and processes simultaneously across numerous concurrent INs, (ii) it can track requests through each service, and (iii) it can provide an end-to-end narrative account of each request. In this manner, the users may (i) monitor each iteration of a function, which enables them to conduct performance tracking by observing which instance of that function is causing the application to slow down and (ii) ascertain how a request travels through multiple applications (e.g., one microservice to the next), particularly when the users do not have enough insight into an implementation of the applications that are called. For example, consider a scenario where millions of users are playing an online video game. In this scenario, the microservices-driven applications may need to track (including but not limited to) (i) each user's location, (ii) each user's interaction with other users and with the system, and (iii) every item the user acquires. For this reason and in order to provide a smooth user experience, a distributed tracing may need to be used. The aforementioned example is not intended to limit the scope of the invention.

A distributed tracking starts the moment a user interacts with an application. For example, when a user sends a request (e.g., a Hypertext Transfer Protocol (HTTP) request), the request is assigned to a unique trace identification (ID). As the request travels through, every operation performed on it (called a "span" or a "child span") is tagged with the request's trace ID and the ID of an operation that originally generated the current request (called a "parent span"). In general, the span ID (e.g., a globally unique identifier (GUID)) represents a basic unit of work (e.g., sending the HTTP request). The trace ID includes one or more span IDs (forming a tree-like structure) and the trace ID will remain the same as one application calls the next application.

Further, each span ID is a single step on the request's journey and is encoded with data relate to an application that is performing an operation on the request. The data may include, for example (but not limited to): a service name of an application handling the request, an address of an application handling the request, a tag to query and filter the request by an identifier (e.g., a session ID), an error message in an event of a failure, etc. A distributed tracing tool (e.g., 170) may then correlate the data from all the spans and traces, and format them into visualizations that are available upon request through, for example, a web interface.

As yet another example, consider the following scenario: (i) a user starts an integrated development environment (IDE) and executes "http://localhost:8080", and in turn, receives "Hello World" displayed on the IDE, (ii) the user adds "private static final Logger LOG=Logger.getLogger (XX.class.getName( ))" as a variable to an application class, (iii) the user changes the application class name to another class name and adds a log statement, (iv) the user then executes "http://localhost:8080", and in turn, receives " . . . [XX-sample, 44462edc42f2ae73, 44462edc42f2ae73, false] . . . ", in which the second value is the trace ID, the third value is the span ID, and the last value indicates whether both IDs should be exported to a distributed tracing tool, (v) the user implements a representational state transfer (REST) template to call the IDE itself, and (vi) the user executes "http://localhost:8080", and in turn, receives two logging statements displayed on the IDE as " . . . [XX-sample, 4329431726958030, 432943172b958030, false] . . . " and " . . . [XX-sample, 4329431726958030, b4d88156bc6a49ec, false] . . . ", in which both trace IDs are the same but the span IDs are different. As described above, the trace IDs allow the user to trace a request as it travels through one application to the next application. Further, the span IDs are different because the user has two different "unit of work" occurring, one for each request.

The aforementioned examples are not intended to limit the scope of the invention.

As discussed above, the system (100) may further include one or more INs (e.g., 112, 132, etc.) that are deployed in different environments (e.g., 110, 140, etc.). For example, (i) IN A (112) and IN C (114) are deployed into Environment A (110), (ii) IN Y (122), IN Z (124), and IN B (126) are deployed into Environment B (120), (iii) IN F (132) is deployed into Environment C (130), and (iv) IN D (142) is deployed into Environment D (140).

In one or more embodiments, each environment may include any number of INs without departing from the scope of the invention. Further, each environment may be, for example (but not limited to): a cloud computing service platform (e.g., Microsoft Azure®, Pivotal Cloud Foundry®, etc.), a distributed caching database (e.g., a Redis Enterprise® distributed caching database), a database (e.g., an Oracle® database), a server (e.g., an Apache Tomcat® server), etc. The aforementioned examples are not intended to limit the scope of the invention.

As used herein, a "server" may provide computer-implemented services (e.g., receiving a request, sending a response to the request, etc.) to the users. In one or more embodiments, the request may be, for example (but not limited to): a web browser search request, a REST request, a computing request, a database management request, etc. To provide the computer-implemented services to the users, the server may perform computations locally and/or remotely. By doing so, the server may utilize different computing devices (e.g., 500, FIG. 5) that have different quantities of computing resources (e.g., processing cycles, memory, storage, etc.) to provide a consistent user experience to the users.

As used herein, a "database" is an organized collection of structured data, typically stored in a computing system. In most cases, a database is controlled by a database management system, in which the data and the database management system (along with the applications that are associated with them) are referred to as a "database system". Data within the database system (simply "database") is typically modeled in rows and columns in a series of tables to make processing and querying efficient. Most databases use structured query language (SQL) for writing and querying data.

Depending on a case, both spreadsheets and databases may be convenient ways to store data; however, the primary differences between the two are, for example (but not limited to): how data is stored and manipulated, who can access data, how much data can be stored, etc. Spreadsheets are designed for a single user or small number of users who do not need to perform complicated data manipulation. In contrast, databases are designed to keep much larger collections of organized data, and they allow multiple users (at the same time) to quickly and securely access the data. Depending on how a user or an organization intends to use data, there may be different types of databases, for example (but not limited to): relational databases, distributed databases, self-driving databases, cloud databases, multimodal databases, etc. The aforementioned examples are not intended to limit the scope of the invention.

As used herein, a "distributed cache" is a system that pools together random access memory (RAM) of multiple networked nodes (e.g., INs) into a single in-memory database (used as a data cache) to provide faster access to data. Typically, most caches are located in one computing device (e.g., a physical server), whereas distributed caches may extend beyond the memory limits of a single computing device with the help of a distributed system architecture for larger capacity and increased processing power. Distributed caches may be used for different use cases, for example (but not limited to): accelerating an application, storing web session data, reducing network traffic, reducing an impact of interruptions, etc.

As used herein, a "cloud" refers servers (described above) that are accessed over the Internet (and the software and databases (described above) that executes on those servers). With the help of cloud (or "cloud computing"), users or organizations do not need to manage physical servers themselves or execute software application on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it were a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, an IN (e.g., 112, 132, etc.) may be a physical computing device or a logical computing device (e.g., a VM) configured for hosting one or more workloads, or for providing a computing environment (e.g., computing power and storage) whereon workloads may be implemented. Further, an IN (e.g., 112, 132, etc.) may exchange data with other INs (e.g., 112, 132, etc.) registered in/to the network (160) in order to participate in a collaborative workload placement. One of ordinary skill will appreciate that an IN (e.g., 112, 132, etc.) may perform other functionalities without departing from the scope of the invention. Examples of an IN (e.g., 112, 132, etc.) may include (but not limited to): an enterprise server, a modular server, a blade server, a mainframe, a workstation computer, etc. In one or more embodiments, an IN (e.g., 112, 132, etc.) may be a heterogeneous set, including different types of hardware components and/or different types of operating systems (OSs). Additional details of an IN are described below in reference to FIG. 2.

In one or more embodiments, a workload (not shown) may refer to a physical or logical component configured to perform certain work functions. Workloads may be instantiated and may be operated while consuming computing resources allocated thereto by the hosting IN (e.g., 112, 132, etc.). Examples of a workload may include (but not limited to): a VM, a container, a database, an application, a collection of microservices, etc.

In one or more embodiments, in order to serve a request received from a user, (i) an application (e.g., 210A, 210N, FIG. 2) executing on an IN (e.g., 112, 132, etc.) may connect to (e.g., communicate with) one another executing on another IN (e.g., 112, 132, etc.) through the network (160), and/or (ii) an application executing on a specific IN (e.g., 112, 132, etc.) may communicate with one another executing on the same IN (e.g., 112, 132, etc.). In one or more embodiments, the "communication" may include a simple data passing, or it may include two or more applications coordinating some activity.

As discussed above, to provide a response to a request, the request may travel through multiple layers (e.g., multiple INs) of the system (100) in order to, for example, generate the response. For example, consider a scenario in which an application executing on IN Y (122) receives a search request from a user through the network (160). In this scenario, upon receiving the request, the application executing on IN Y (122) communicates with an application executing on IN A (112) and sends the request through the network (160). The application executing on IN A (112) then communicates with an application executing on IN C (114) and sends the request. The application executing on IN C (114) then communicates with an application executing on IN F (132) and sends the request through the network (160).

The application executing on IN F (132) then communicates back to the application executing on IN C (114) and provides a response (to the request) through the network (160). Similar to how the application executing on IN C (114) is received the request from the application executing on IN A (112), the application executing on IN C (114) provides the response back to the application executing on IN A (112). The application executing on IN A (112) then provides the response back to the application executing on IN Y (122) through the network (160). The application executing on IN Y (122) then provides the response to the user through the network (160). The aforementioned example is not intended to limit the scope of the invention.

In one or more embodiments, while performing one or more operations requested by a user and/or an administrator of the clients (150), an application may include functionality to request and use resources (e.g., data, computing resources, etc.) of any IN (e.g., 112, 132, etc.) available in the system (100). The applications may perform other types of functionalities not listed above without departing from the scope of the invention. In one or more embodiments, the administrator may be a user with permission to make changes on the clients (150) that will affect other users of the clients (150).

In one or more embodiments, because, for example, IN A (112) and IN Y (122) are located in different environments (110 and 120, respectively), there may be a security breach while IN Y (122) is trying to communicate with IN A (112). However, because a user and/or an administrator (of the system (100)) has already obtained the required service access licenses for both environments, IN Y (122) can communicate with IN A (112) without generating a security breach.

In one or more embodiments, a microservice architecture (also referred to herein as "a microservice") is a software approach in which a single application is composed of many loosely coupled and independently deployable smaller services. A microservice may allow a large application to be divided into smaller independent parts (with each part having its own responsibility), and may provide a framework to develop, deploy, and maintain services independently. In this type of application architecture, (i) each service may have its own (e.g., allocated) technology stack (e.g., RAM, memory, data management model, etc.) and (ii) each service may communicate with one another over a combination of REST application programming interfaces (APIs), message brokers, and/or event streaming.

Comparing to a monolithic architecture, microservices compose a single application from many smaller, loosely coupled services as opposed to the monolithic approach of a large, tightly coupled application. For example, to serve a single request, a microservices-based application may call on many other (internal) microservices to compose its response. In most cases, containers (as a well-suited microservices architecture) are preferred because they allow a user to develop services without worrying about the dependencies. The microservices architecture may be used for, for example (but not limited to): website migration, media (e.g., images, videos, etc.) content storage, payment processing and ordering, data processing, etc.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS make a container lightweight, fast, and portable.

Applications need to communicate with one another with a minimum amount of latency. For this reason, in most cases, REST APIs are used for communications between the applications. The term "REST" defines a set of rules and constraints that need to be followed when building the services. Any application that adheres to those rules and constraints will be able to communicate via a set of uniform, shared, and stateless operators and requests. APIs denote the underlying code that, if it conforms to the set of rules and constraints, allows the applications to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate an application's connection (e.g., access) to one another. In general, the application performing the accessing is called "the client", and the application containing a resource is called "the server".

In operation, REST APIs use HTTP to communicate. More specifically, REST APIs communicate via HTTP to perform standard database functions such as creating, reading, updating, and deleting records within a resource. For example, a well-designed REST API is similar to a webpage executing on a web browser with built-in HTTP functionality. As used herein, "HTTP" is a request/response protocol that is used in cases in which a synchronous request/response is required. This means that applications (e.g., services) making requests via REST APIs must be designed to expect an immediate response. If the client receiving the response is down, the sending service may be blocked while it awaits for the response. To prevent this, failover and error handling logic may be applied to (e.g., built into) both applications.

Comparing to REST APIs, message brokers enable asynchronous communications between applications so that the sending service need not wait for the receiving service's response. The use of message brokers may (i) improve fault tolerance and resiliency in distributed systems and (ii) make easier to scale distributed systems because publish/subscribe messaging pattern of message brokers can readily support changing number of applications.

As used herein, a "message broker" is a software module that enables applications to communicate with each other and exchange data, in which a message broker performs this by translating messages between messaging protocols. In this manner, applications may communicate with one another directly, even if they were written in different languages or implemented on different platforms.

A message broker may validate, store, route, and deliver messages to appropriate destinations. Further, a message broker may serve as an intermediary between applications, allowing senders to issue messages without knowing where the receivers are, whether or not they are active, or how many of them there are. This may facilitate decoupling of processes and services within distributed systems. Further, with the help of its asynchronous communication feature, a message broker may prevent loss of valuable data and may enable distributed systems to continue functioning even if there is an intermittent connectivity or latency issues on the network.

In one or more embodiments, an application may communicate with one another via ports. For example, in order to establish a connection between an application (e.g., application A (App. A)) executing on IN A (112) and an application (e.g., application B) executing on IN B (126), App. A's corresponding port (e.g., port 443, port 1521, port 8881, etc.) and App. B's corresponding port should be open (e.g., active, on, etc.). Otherwise, App. A may not communicate with App. B in order to, for example, transfer data or coordinate some activity.

As used herein, a "port" is a number representing communication endpoints in computer networking. A port is an unsigned 16-bit integer (0-65535) that identifies a specific process or a network service. In most cases, a port may use a transmission control protocol (TCP) or a user datagram protocol (UDP). The TCP enables two hosts to establish a connection and to exchange streams of data packets. The TCP also guarantees a delivery of data packets, in which the data packets will be delivered in the same order they were sent. Like the TCP, the UDP can be used in combination with Internet Protocol (IP) and it facilitates a transmission of datagrams from one application to another application. However, unlike the TCP, the UDP does not guarantee a reliable communication. This means that it is up to the application (that received the message) to process any errors and verify the delivery.

Further, even if the corresponding ports of App. A and App. B are open (and they are ready to communicate), IN A (112) and IN B (126) should allow the communication between App. A and App. B. For this reason, the ports that will be used for the communication should also be opened in IN A (112) and in IN B (126). More specifically, these ports should be opened in the firewall of IN A (112) and of IN B (126). Otherwise, App. A may not communicate with App. B, even if their corresponding ports are ready to communicate.

To prevent that, for example, IN A (112) may make an API call to IN B (126). As described herein, an "API call" may refer to a process of an application or a computing device submitting a request to an API to retrieve the requested data from an external application or an external computing device. Based on receiving the API call from IN A (112), IN B (126) may send a connection string to IN A (112). IN A (112) may then use that connection string to connect to IN B (126). In one or more embodiments, the connection string may be a data structure that includes one or more parameters (e.g., a location of a database, an authentication information for a database, etc.) required for IN A (112) to connect to IN B (126).

Figure 2:
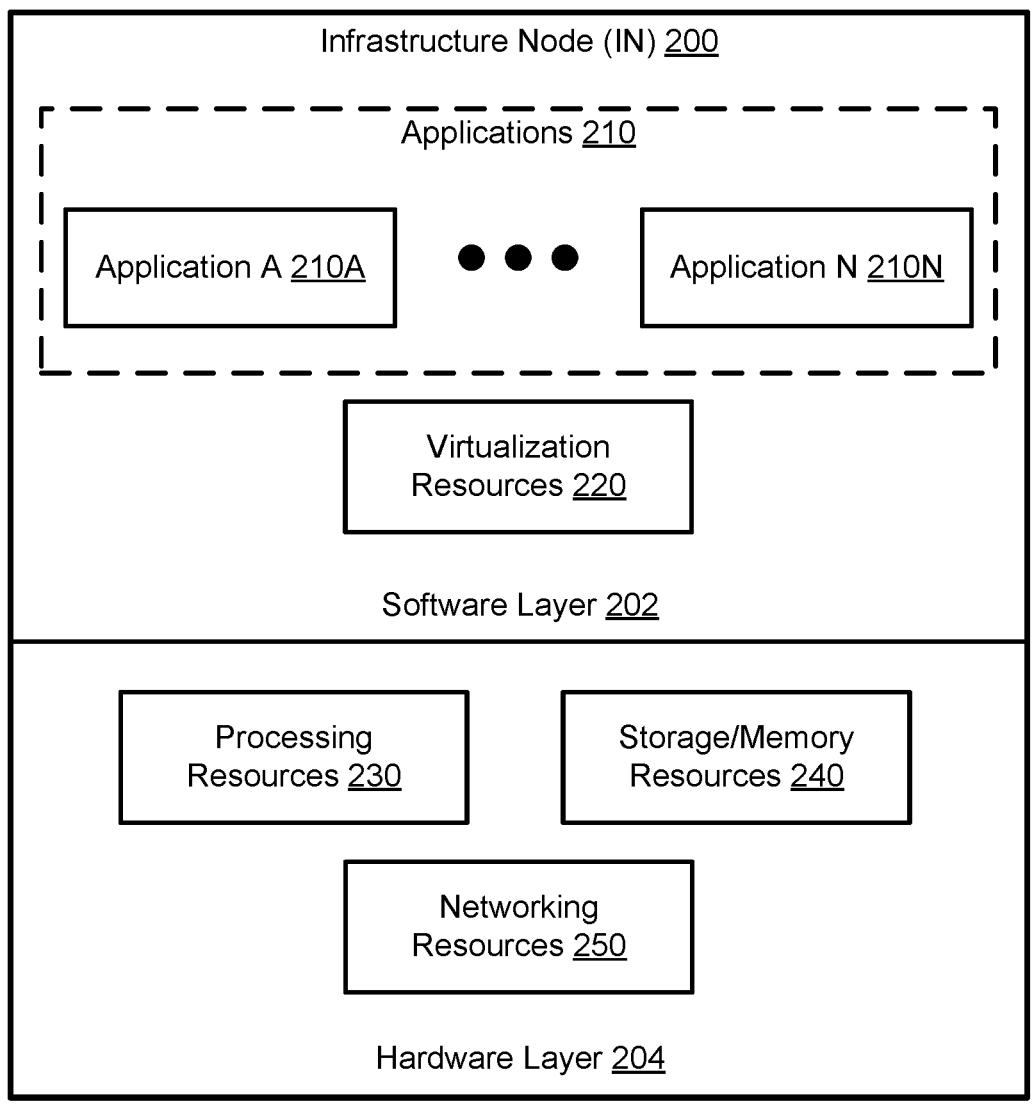
FIG. 2 shows a diagram of an infrastructure node in accordance with one or more embodiments of the invention.

In one or more embodiments, IN B (126) may be offline for, for example, a system maintenance to configure and upgrade its processing resources (e.g., 230, FIG. 2). While IN B (126) is offline, the connection between IN A (112) and IN B (126) may be disconnected. When IN B (126) comes back online, IN A (112) may reconnect to IN B (126) using the same connection string.

As used herein, a "firewall" is a network monitoring/security component that monitors incoming and outgoing network traffic, in which it decides whether to allow or block specific traffic based on a defined set of security rules. A firewall may be, for example (but not limited to): a hardware component, a software component, a software-as-a-service (SaaS), a private cloud, etc. The aforementioned example is not intended to limit the scope of the invention.

A firewall may monitor network traffic to determine, for example (but not limited to): network availability, unusual activities on a network, etc. In most cases, an unusual activity (e.g., an unusually high amount of network traffic) on a network may be a sign of a security issue (e.g., a malicious attack). Because of the determined unusual activity, the firewall may notify an administrator (e.g., a network service provider (NSP) of the network. Based on receiving the notification from the firewall, the NSP of the network may reconfigure the network to fix the security issue.

As used herein, a "network traffic" is an amount of data moving across a network at any given time. For example, in search engine optimization, a network traffic may be characterized as being either direct, organic, or paid, in which (i) direct network traffic may be initiated when a user types a website's uniform resource locator (URL) in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, in data center administration, a network traffic may be characterized as either being north-south or east-west, in which (i) north-south network traffic may be client-to-server network traffic that operates between a client and a server and (ii) east-west network traffic may be server-to-server network traffic that operates between servers within a data center.

Figure 5:
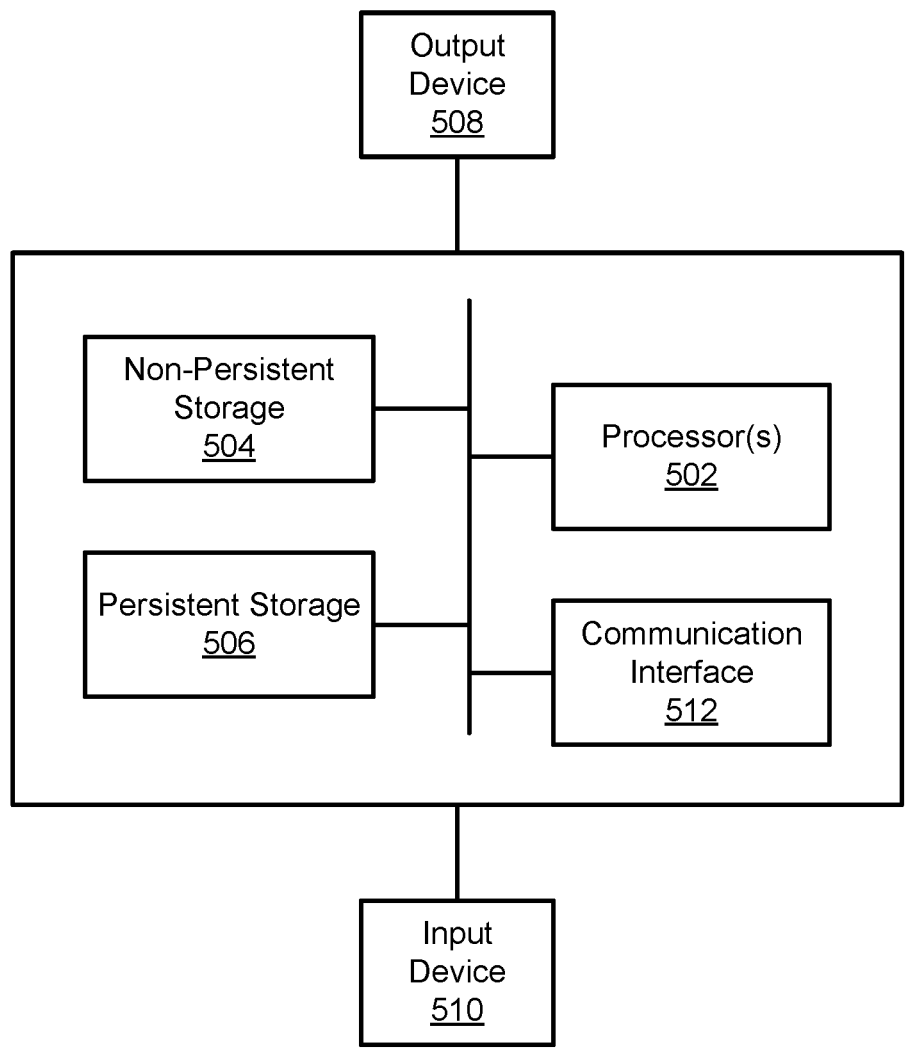
FIG. 5 shows a diagram of a computing device in accordance with one or more embodiments of the invention.

In one or more embodiments, the INs (e.g., 112, 132, etc.) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, solid-state drives (SSDs), etc.). The computing device may include instructions, stored in the persistent storage, that when executed by the processor(s) of the computing device, cause the computing device to perform the functionality of the INs (e.g., 112, 132, etc.) described throughout this application.

Alternatively, in one or more embodiments, the INs (e.g., 112, 132, etc.) may be implemented as logical devices. A logical device may utilize the computing resources of any number of computing devices to provide the functionality of the INs (e.g., 112, 132, etc.) described throughout this application.

In one or more embodiments, the clients (150) may provide computer-implemented services to users of the clients (150) (and/or other devices such as, other clients or other types of devices). The clients (150) may provide any number and any type of computer-implemented services (e.g., data storage services, electronic communication services, etc.). The clients (150) may be physical or logical devices, as discussed below.

To provide computer-implemented services, entities hosted by the clients (150) may utilize data from any number of resources. For example, the clients (150) may utilize data stored in storage/memory resources (e.g., 240, FIG. 2). The clients (150) may utilize data from other resources without departing from the invention.

In one or more embodiments, the clients (150) may issue requests to INs (e.g., 112, 132, etc.) to (i) receive responses and (ii) interact with various components of INs (e.g., 112, 132, etc.) (described below). The clients (150) may also request data and/or send data to INs (e.g., 112, 132, etc.). Further, the clients (150) may initiate an application to execute on one or more INs (e.g., 112, 132, etc.) such that the application may (itself) gather, transmit, and/or otherwise manipulate data located on the INs (e.g., 112, 132, etc.), remote to the clients (150). In one or more embodiments, the clients (150) may share access to the same INs (e.g., 112, 132, etc.) and may similarly share any data located on those INs (e.g., 112, 132, etc.).

In one or more embodiments, the clients (150) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (150) described throughout this application.

Alternatively, in one or more embodiments, similar to the INs (e.g., 112, 132, etc.), the clients (150) may also be implemented as logical devices.

In one or more embodiments, the network (160) may represent a decentralized (or distributed) computing network configured for computing resource and/or messages exchange among registered computing hosts (i.e., the INs (e.g., 112, 132, etc.)). As discussed above, components of the system (100) may operatively connect to one another through the network (160) (e.g., a local area network (LAN), a wide area network (WAN), a mobile network, a wireless LAN (WLAN), etc.). In one or more embodiments, the network (160) may be implemented using any combination of wired and/or wireless connections. Further, the network (160) may enable interactions between the INs (e.g., 112, 132, etc.) through any combination of wired and/or wireless network protocols (e.g., TCP, UDP, Internet Protocol version 4 (IPv4), etc.).

The network (160) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more INs (e.g., 112, 132, etc.) in the network (160), and (iii) limiting communication(s) on a granular level (e.g., on a per-port level, on a per-sending device level, etc.).

In one or more embodiments, before communicating data over the network (160), the data may first be broken into smaller batches (e.g., data packets) so that larger size data can be communicated efficiently. For this reason, the network-enabled subcomponents may break data into data packets. The network-enabled subcomponents may then route each data packet in the network (160) to distribute the network traffic uniformly.

In one or more embodiments, the network-enabled subcomponents may decide how real-time network traffic and non-real-time network traffic should be managed in the network (160). In one or more embodiments, the real-time network traffic may be high priority (e.g., urgent, immediate, etc.) network traffic. For this reason, data packets of the real-time network traffic may need to be prioritized in the network (160). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (160). The non-real-time network traffic may include data packets related to, for example (but not limited to): File Transfer Protocol (FTP) for web publishing, email applications, etc.

As discussed above, a distributed system is composed of several applications calling each other to complete an operation (e.g., generating a response to a request). Each of these applications emits its own logs and often stores them in different locations within the distributed system. This process may be called as "distributed logging". In most cases, for an easier post-analysis (e.g., parsing, distributed tracing, etc.), each application may structure its log in a standard format, such as JavaScript Object Notation (JSON).

Distributed logging is a practice of keeping log files decentralized, specifically in large-scale distributed systems, because (by nature) applications executing on those systems generates a lot of logs, making centralized logging more burdensome and less cost effective. In most cases, logging in a distributed system is not a difficult task; however, inferring (e.g., making sense of) the distributed logs from a logical point of view may be cumbersome.

To overcome this (e.g., to address the loosely coupled, modular nature of microservice architecture), the recommendation engine (170) may use distributed tracing (described above) to correlate the distributed logs coming from different applications to get a logical view of all logs relevant to the processing of a specific request. While correlating, the recommendation engine (170) may use the parameters available in the distributed logs (discussed below) in order to, for example (but not limited to): trace a specific request through a distributed system, identify potential errors (e.g., performance issues) occurred while processing a specific request (e.g., which application was down while processing a specific request, which request caused an application to went down, etc.), trace requests that display high latency across all applications, reduce mean time to troubleshooting performance issues, get immediate root-cause identification of every application impact, improve user experience by re-establishing end-to-end interoperability, etc. In this manner, the recommendation engine (170) may infer, for example (but not limited to): dependencies among applications (e.g., which applications are working together), a connectivity among applications (e.g., which ports are open), etc.

In one or more embodiments, a distributed log may include, for example (but not limited to): a timestamp showing when a specific request is processed by an application, a port number, a protocol type associated with a port number, computing resource details and an IP address of an IN hosting an application where a specific request is processed, an identifier of an application, computing resource details and an IP address of a client who sent a specific request, etc. The aforementioned example is not intended to limit the scope of the invention.

For example, consider a scenario in which App. X (executing on IN Y (122)) receives a request from a user through the network (160). Upon receiving the request, App. X communicates with App. Y (executing on IN A (112)) and sends the request to App. Y through the network (160). App. Y then communicates with App. Z (executing on IN C (114)) and sends the request. App. Z then communicates back to App. Y and provides a response (to the request) to App. Y. Similar to how App. Y is received the request from App. X, App. Y provides the response back to App. X. App. X then provides the response to the user through the network (160).

For the above scenario, while executing a back-tracing process (e.g., distributed tracing) based on the distributed logs, the recommendation engine (170) may assign a unique trace ID for the request. As the request moves through the distributed system, the recommendation engine (170) may assign a set of span IDs for every new process that is needed along the journey. For example, the recommendation engine (170) may assign (i) "trace ID: a, span ID: 1" to App. X, (ii) "trace ID: a, span ID: 2" to App. Y, and (iii) "trace ID: a, span ID: 3" to App. Z.

As indicated, when one application calls the next application, the trace ID remains the same, but each applications is marked with a different span ID (to specify which applications processed the request). Consequently, based on the above-executed distributed tracing process, the recommendation engine (170) infers that, for example, (i) the request passed through Apps. X-Z (respectively) and (ii) Apps. X-Z are operating together (e.g., dependent on each other).

Additional functionalities of the recommendation engine are described below in reference to FIGS. 3.1-3.3.

In one or more embodiments, the recommendation engine (170) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the recommendation engine (170) described throughout this application.

Alternatively, in one or more embodiments, similar to the INs (e.g., 112, 132, etc.), the recommendation engine (170) may also be implemented as a logical device.

In one or more embodiments, the recommendation engine (170) is configured to perform all, or a portion, of the functionality described in FIGS. 3.1-3.3.

Turning now to FIG. 2, FIG. 2 shows a diagram of an IN (200) in accordance with one or more embodiments of the invention. The IN (200) may be any one of the INs (e.g., 112, 132, etc.) discussed above in reference to FIG. 1. The IN (200) may include a hardware layer (204) and a software layer (202). The IN (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the hardware layer (204) is a collection of physical components configured to perform operations of the IN (200) and/or otherwise execute a collection of logical components (e.g., applications (210), virtualization resources (220), etc.) of the software layer (202).

In one or more embodiments, a processing resource (e.g., 230) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

As used herein, a "CPU" may refer to an electronic circuitry that may execute operations specified by an application. A CPU may perform an operation based on the following three steps: (i) fetching instructions related to an operation from the storage/memory resources (240), (ii) analyzing the fetched instructions, and (iii) performing the operation based on the analysis. In one or more embodiments, an operation may be, for example (but not limited to): comparing numbers, performing a function, displaying a video, etc.

As used herein, a "GPU" may refer to an electronic circuitry that may provide parallel data processing capabilities to generate enhanced, real-time graphics and to perform accelerated computing tasks (which is particularly useful for machine learning (ML) operations). In one or more embodiments, a GPU may include, for example (but not limited to): a graphics memory controller, a video processing engine, a graphics and computation engine, etc.

As used herein, a "DPU" may refer to an electronic circuitry that may perform accelerated data processing and optimized data movement data within the IN (200). In one or more embodiments, the DPU may include, for example (but not limited to): a high-speed (e.g., 200 gigabits per second (200 Gbps)) networking interface, dynamic RAM (DRAM), a multi-core (e.g., 8-core) CPU, programmable acceleration engines (particularly for ML, security, and telecommunications purposes), etc.

In one or more embodiments, a storage or memory resource (e.g., 240) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data in the IN (200). Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in the IN (200). The data stored may be accessed almost instantly (e.g., in milliseconds) regardless of where the data is stored in memory. The memory may provide the above-mentioned instant data access because the memory may be directly connected to a CPU (described above) on a wide and fast bus (e.g., a high-speed internal connection that transfers data among hardware components of the IN (200)).

In one or more embodiments, the hardware layer (204) may further include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources (240), and the MMU may be the sole path to access the memory, as all data destined for the memory must first traverse the MMU prior to accessing the memory. Further, the MMU may be configured to (i) provide memory protection (e.g., allowing only certain applications to access memory) and (ii) provide cache control and bus arbitration.

In one or more embodiments, a networking resource (e.g., 250) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one embodiment of the invention, a networking resource (e.g., 250) may provide capabilities to interface the IN (200) with external entities (e.g., the clients (e.g., 150, FIG. 1), other INs (e.g., 112, 132, FIG. 1), etc.) and to allow for the transmission and receipt of data with those devices. A networking resource (e.g., 250) may communicate via any suitable form of wired interface (e.g., Ethernet, fiber optic, serial communication etc.) and/or wireless interface, and may utilize one or more protocols (e.g., TCP, UDP, Remote Direct Memory Access, IEEE 801.11, etc.) for the transmission and receipt of data.

In one or more embodiments, a networking resource (e.g., 250) may implement and/or support the above-mentioned protocols to enable the communication between the IN (200) and the external entities. For example, a networking resource (e.g., 250) may enable the IN (200) to be operatively connected, via Ethernet, using a TCP protocol to form a "network fabric", and may enable the communication of data between the IN (200) and the external entities. In one or more embodiments, each IN (e.g., IN (200)) within the distributed system (e.g., 100, FIG. 1) may be given a unique identifier (e.g., an IP address) to be used when utilizing the above-mentioned protocols.

Further, in one or more embodiments, a networking resource (e.g., 250), when using certain a protocol or variant thereof, supports streamlined access to storage/memory media of other INs in the distributed system (e.g., 100, FIG. 1). For example, when utilizing remote direct memory access (RDMA) to access data on another IN (e.g., 112, 132, etc.) in the distributed system (e.g., 100, FIG. 1), it may not be necessary to interact with the software layer (e.g., 202) of that IN. Rather, when using RDMA, it may be possible for the networking resource (e.g., 250) to interact with the hardware layer (e.g., 204) of that IN to retrieve and/or transmit data, thereby avoiding any higher-level processing by the software layer (e.g., 202) executing on that IN.

In one or more embodiments, the software layer (202) may include virtualization resources (220) and applications (210) (and/or content accessible through the applications (210)). The applications (210) may vary in different embodiments, but in certain embodiments, the applications (210) may be custom developed or commercial (e.g., off-the-shelf) applications that an organization or a user desire to execute in the distributed system (e.g., 100, FIG. 1).

In one or more embodiments, the applications (210) may be implemented as computer instructions, e.g., computer code, stored in the storage/memory resources (240) that when executed by the processing resources (230) cause the IN (200) to provide the functionality of the applications (210) described throughout this application. Each of the applications (e.g., 210A, 210N) may include functionality to provide computer-implement services, for example (but not limited to): a workload placement collaboration, serving (e.g., processing) a request, sharing a distributed log, receiving computing resource details of an IN, transmitting a request, analyzing data, streaming video, etc. Those skilled in the art will appreciate that the applications (210) may perform other functionalities without departing from the scope of the invention.

In one or more embodiments, while the applications (210) provide computer-implemented services to the clients (e.g., 150, FIG. 1), the applications (210) may store data that may be relevant to the clients (e.g., 150, FIG. 1) to the storage/memory resources (240). When the client-relevant data is stored, the client-relevant data may be subjected to loss, inaccessibility, or other undesirable characteristics based on the operation of the storage/memory resources (240).

To mitigate, limit, and/or prevent such undesirable characteristics, users of the clients (e.g., 150, FIG. 1) may enter into agreements (e.g., service level agreements) with providers of the storage/memory resources (240). These agreements may limit the potential exposure of client-relevant data to undesirable characteristics. The agreements may, for example, require duplication of client-relevant data to other locations so that if the storage/memory resources (240) fails, another copy (or other data structure usable to recover the data on the storage/memory resources (240)) of the client-relevant data may be obtained. The agreements may specify other types of activities to be performed with respect to the storage/memory resources (240) without departing from the invention.

In one or more embodiments, each of the applications (e.g., 210A, 210N) may include a virtual address space. A virtual address space may be a simulated range of addresses (e.g., identifiable locations) that mimics physical locations of one or more components of the hardware layer (204). In most cases, an application is not configured to identify the physical locations of the components of the hardware layer (204); rather, the application relies on other components of the IN (200) to translate one or more virtual addresses of the virtual address space to one or more physical addresses of the components of the hardware layer (204). Accordingly, in one or more embodiments, an application may utilize a virtual address space to read, write, and/or otherwise manipulate data, without being configured to directly identify the physical address of that data within the components of the hardware layer (204).

Further, each of the applications (e.g., 210A, 210N) may communicate with other components of the IN (200) to establish a mapping between a virtual address space and the components of the hardware layer (204). In one or more embodiments, when a mapping is established, an application's use of the virtual address space enables the application to directly manipulate data in the hardware layer (204), without relying on other components of the IN (200) to repeatedly update mappings between the virtual address space and the physical addresses of the components of the hardware layer (204).

In one or more embodiments, a virtualization resource (e.g., 220) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of the IN (200) or using computing resources of other INs connected to the IN (200). The VM (and applications hosted by the VM) may generate data (e.g., VM data) that is stored in the storage/memory resources (240), in which the VM data may reflect a state of the VM. In one or more embodiments, the VM may provide services to the clients (e.g., 150, FIG. 1), and may host instances of databases, email servers, or other applications that are accessible to the clients (e.g., 150, FIG. 1).

In one or more embodiments, the virtualization resources (220) may include a hypervisor, in which the hypervisor may be configured to orchestrate an operation of the VM by allocating computing resources of the IN (200) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on the storage/memory resources (240) that when executed by the processing resources (230) cause the IN (200) to provide the functionality of the hypervisor.

While FIG. 2 shows a specific configuration of an IN, other configurations may be used without departing from the scope of the disclosure. Accordingly, embodiments disclosed herein should not be limited to the configuration of devices and/or components shown in FIG. 2.

FIGS. 3.1-3.3 show a method for determining a suitable migration environment (e.g., a suitable migration IN) to migrate an application in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed recommendation engine (e.g., 170, FIG. 1). Other components of the distributed system (100) illustrated in FIG. 1 may also execute all or part of the method shown in FIG. 3.1 without departing from the scope of the invention.

In Step 300, the recommendation engine receives an application migration request from the clients (e.g., 150, FIG. 1) over the network (e.g., 160, FIG. 1). In one or more embodiments, an administrator or a user (e.g., a requesting entity) of the clients sends the request because of an alert (e.g., a predictive alert, a proactive alert, a technical alert, etc.) triggered in one of the INs (e.g., IN A (e.g., 112, FIG. 1)), and the requesting entity does not want to lose any data of an application executing on that IN. The alert may specify, for example (but not limited to): a hardware issue (e.g., a medium level of CPU overheating is detected, a recommended maximum CPU operating temperature is exceeded, etc.), a licensing issue, a service level agreement issue, an operating cost issue, etc.

In one or more embodiments, the alerts may be defined by a vendor of that IN, by a technical support specialist, by another entity, or any combination thereof. The alerts may be defined based on a data protection policy.

In Step 302, in response to the request (received in Step 300), the recommendation engine obtains distributed logs for each application executing on the distributed system. In one or more embodiments, the recommendation engine may make an API call to, for example, to the storage/memory resources (e.g., 240, FIG. 2) of IN A (e.g., 112, FIG. 1) to obtain the distributed logs stored on IN A. Based on receiving the API call from the recommendation engine, the storage/memory resources of IN A may allow the recommendation engine to obtain the distributed logs. Details of the distributed logs, application, and IN have been described above in reference to FIGS. 1 and 2, respectively.

In Step 304, the recommendation engine executes distributed tracing to process and extract relevant data from the distributed logs (obtained in Step 302). Said another way, by executing distributed tracing, the recommendation engine analyzes the distributed logs in order to extract data that is relevant to (related to or associate with) at least dependencies and connectivity among the applications. Execution of the distributed tracing may entail processing of computer readable program code or computing instructions reflected thereby. In one or more embodiments, the relevant data may include, for example (but not limited to): a trace ID, a span ID, etc. Details of the distributed tracing, trace ID, and span ID have been described above in reference to FIG. 1.

In Step 306, based on the relevant data (extracted in Step 304), the recommendation engine infers dependencies and connectivity among the applications. For example, consider a scenario in which App. K (executing on IN Y (e.g., 122, FIG. 1)) receives a search request from a user through the network. Upon receiving the search request, App. K communicates with App. L (executing on IN A (e.g., 112, FIG. 1)) and sends the search request to App. L through the network. App. L then communicates with App. M (executing on IN D (e.g., 142, FIG. 1)) and sends the search request to App. M through the network. App. M then communicates back to App. L and provides a response (to the search request) through the network. However, on the way back, App. L could not provide the response to App. K because App. L went down (for example, due to a critical level of CPU overheating issue in IN A after sending the search request to App. M).

For the above scenario, based on the relevant data, the recommendation engine assigns a unique trace ID for the search request. As the search request moves through the distributed system, the recommendation engine assigns a set of span IDs for every new process that is needed along the journey. For example, the recommendation engine assigns (i) "trace ID: xx, span ID: 1" to App. K, (ii) "trace ID: xx, span ID: 2" to App. L, and (iii) "trace ID: xx, span ID: 3" to App. M. Based on the assigned IDs (and other parameters available in the relevant data), the recommendation engine infers that (i) the search request travelled through Apps. K-M (respectively), (ii) Apps. K-M are operating together (e.g., dependent on each other), and (iii) ports 443, 1521, and 8881 are open and used by Apps. K-M (e.g., connectivity among Apps. K-M). The aforementioned example is not intended to limit the scope of the invention.

In Step 308, based on the relevant data, the recommendation engine further infers computing resource details of IN A. For example, the recommendation engine infers that IN A includes: (i) 16 Gigabytes (GB) DRAM, (ii) 1 CPU with 32 cores, (iii) 100 GB SSD storage, (iv) 10 Gigabytes per second (GB/s) bandwidth (BW) with 5 milliseconds (ms) latency quality of service (QOS), (v) a GPU with 10 GB frame buffer, and (vi) 16 GB/s BW DPU with 16 GB frame buffer. The aforementioned example is not intended to limit the scope of the invention.

In Step 310, based on the relevant data, the recommendation engine further infers connection establishment (e.g., connection setup) times and network connection reliability among the applications. In one or more embodiments, "connection establishment time" refers to the time needed to establish, for example, a TCP session between a client and a server before data transfer can begin. Based on the scenario discussed above in Step 306, for example, if (i) establishing a TCP session between the user and App. K takes five seconds, (ii) establishing a TCP session between App. K and App. L takes four seconds, and (iii) establishing a TCP session between App. L and App. M takes seven seconds, then establishing a connection between the user and App. M (e.g., the server) takes sixteen seconds.

In most cases, if the actual connection establishment time is significantly longer than the needed connection establishment time, this might indicate that there is an issue caused by, for example (but not limited to): a server, a network (e.g., LAN) connection, a CPU, a spike in network round trip time, an increase in a network traffic volume, an insufficient BW, an ongoing software update in a router, an exceeded TCP/IP session limit, etc.

In one or more embodiments, "network connection reliability" indicates a number of data packets that are delivered to a destination in a certain period of time. For example, consider a scenario in which App. M provides 2000 data packets (as a response) to App. L, and App. L drops 500 of them while providing the response to App. K. Because of the missing data packets along the way, the client receives 1500 of them as the response. As indicated, the network connection between the client and App. M is not reliable because some of the data packets are not delivered to the client.

As yet another example, consider a scenario in which (i) App. K receives 100 data packets (as a request) from the client but sends 75 of them to App. L, and (ii) App. L receives the 75 data packets from App. K but sends 50 of them to App. M. In this scenario, consequently, App. M (e.g., the server) receives 50 data packets and the remaining packets are dropped within the network layers due to non-reliable network connections between Apps. K-M. For this reason, App. M could not generate a response to the request because App. M does not receive the whole request.

In most cases, a non-reliable network connection may be caused by, for example (but not limited to): an issue between network layers (e.g., network-enabled subcomponents), an ongoing software update in a gateway, an increase in a network traffic volume, an insufficient BW, not having a redundant gateway, etc.

In Step 312, the recommendation engine generates a target IN configuration template based on (at least) (i) the inferred dependencies and connectivity among Apps. K-M, (ii) the inferred computing resource details of IN A, and (iii) the inferred connection establishment times and network connection reliability among Apps. K-M. In one or more embodiments, the target IN configuration template may specify, for example (but not limited to): IN A includes 16 GB DRAM, 1 CPU with 32 cores, and 100 GB SSD storage, a client communicates with App. K using port 443 and TCP, App. K communicates with App. L using port 8881 and TCP, App. L communicates with App. M using port 1521 and TCP, establishing a TCP session between App. K and App. M took sixteen seconds, App M. is received 100% of the request, etc. The aforementioned example is not intended to limit the scope of the invention.

In one or more embodiments, the target IN configuration template may correspond to a template that will be used while querying a target IN (across other INs in the distributed system except IN A) for App. L to migrate.

Turning now to FIG. 3.2, the method shown in FIG. 3.2 may be executed by, for example, the above-discussed recommendation engine. Other components of the distributed system (100) illustrated in FIG. 1 may also execute all or part of the method shown in FIG. 3.2 without departing from the scope of the invention.

In Step 314, the recommendation engine generates a configuration query message. In one or more embodiments, the configuration query message may include, for example (but not limited to): a target IN configuration template (generated in Step 312), a name of an environment where App. L is deployed to, a type of an environment where App. L is deployed to, etc. The message may represent a collection of one or more network traffic data units (e.g., frames, packets, datagrams, etc.), which may be configured to encapsulate and disseminate data to one or more destinations (e.g., other INs except IN A) through the network. The encapsulated data may include at least the target IN configuration template.

In Step 316, the recommendation engine multicasts the message (generated in Step 314) to other INs. In one or more embodiments, multicasting may refer to a single transmission of data, over a network (e.g., 160, FIG. 1), to a group of destinations or addressees (e.g., other INs except IN A) simultaneously.

In Step 318, the recommendation engine receives one or more configuration query responses from other INs. In one or more embodiments, each received configuration query response may be obtained from an IN whom may have replied to the message (multicasted in Step 316). Further, each received configuration query response may represent a collection of one or more network traffic data units, which may be configured to encapsulate and disseminate data to the recommendation engine through the network.

In one or more embodiments, the encapsulated data in each configuration query response may vary depending on whether the response represents a matching or a mismatching response. A matching configuration query response, from a given candidate target IN (e.g., candidate one), may reflect that a configuration of candidate one is consistent with the target IN configuration template (generated in Step 312). In one or more embodiments, a configuration of a candidate target IN may specify, for example (but not limited to): a number of an open port, a protocol type associated with an open port, a computing resource detail of that IN, etc.

In contrast, a mismatching configuration query response, from a given candidate target IN (e.g., candidate two), may reflect that a configuration of candidate two is inconsistent with the target IN configuration template. The mismatching configuration query response may also reflect one or more metrics highlighting discrepancies between the configuration of candidate two and the target IN configuration template.

In Step 320, a determination is made as to whether any (i.e., at least one) immediate lift and shift target IN exists. Said another way, a determination is made as to whether any consistent response (described above) is received (in Step 318). Accordingly, in one or more embodiments, if the result of the determination is YES, the method proceeds to Step 322. If the result of the determination is NO, the method alternatively proceeds to Step 326.

In one or more embodiments, before executing the determination, the recommendation engine extracts encapsulated data from the consistent and inconsistent configuration query responses. Based on the extracted data, the recommendation engine acts as a decision component for selecting a matching target IN (e.g., an immediate lift and shift IN, a ready-to-migrate IN, etc.). In one or more embodiments, if the request (received in Step 300 of FIG. 3.1) is an urgent request, the recommendation engine may need to find/select a matching target IN immediately so that it can initiate migration of App. L to that IN. In this manner, the recommendation engine may at least minimize adverse effects of the hardware issue occurred in IN A to the distributed system.

In one or more embodiments, while selecting/finding an immediate lift and shift IN (based on a migration strategy), the recommendation engine may need to consider a relationship of App. L with other Apps. in the distributed system. For example, based on the inferred dependencies among Apps. K-M, the recommendation engine needs to make sure that, in its new IN (e.g., the immediate lift and shift IN), App. L can still communicate with Apps. K and M through the corresponding ports and protocols. The recommendation engine needs to make sure the above even if Apps. K and M are not being migrated (e.g., Apps. K and M are not part of the migration strategy). In this manner, operation of Apps. K and M (and the clients) will not be majorly impacted because of an ongoing migration of App. L or a configuration of the new IN.

As used herein, "lift and shift" is a process of migrating an exact copy of an application or a workload (and its data store and OS) from one IT environment to another, usually from on-premises to public or private cloud. In most cases, as being an Infrastructure-as-a-Service (IaaS) migration, the lift and shift strategy enables a faster, less labor-intensive, minimally disruptive, and less costly migration against to other migration processes (e.g., a Platform-as-a-Service (PaaS), a Software-as-a-Service (SaaS), etc.).

Continuing with the discussion of Step 320, for example, consider a scenario in which (a) IN A (e.g., the source IN) includes: (i) 16 GB DRAM, (ii) 1 CPU with 32 cores, (iii) 100 GB SSD storage, (iv) 10 GB/s BW with 5 ms latency QoS, (v) a GPU with 10 GB frame buffer, (vi) 16 GB/s BW DPU with 16 GB frame buffer, and (vii) open 8881 and 1521 ports, and (b) a first candidate target IN (e.g., candidate A) includes: (i) 4 GB DRAM, (ii) 2 CPU with 32 cores, (iii) 25 GB SSD storage, (iv) 20 GB/s BW with 3 ms latency QoS, (v) a GPU with 10 GB frame buffer, (vi) 16 GB/s BW DPU with 16 GB frame buffer, and (vii) open 8881 port but closed 1521 port. In this scenario, the recommendation engine may determine that candidate A is not an immediate lift and shift target IN, because: (i) port 1521 is closed, (ii) it has 4 GB DRAM (less than 16 GB DRAM), and (iii) it has 25 GB SSD storage (less than 100 GB SSD storage) (even if it may provide more computing power and a faster network communication with lower number of network hops (e.g., network-enabled subcomponents)).

As yet another example, consider a scenario in which a second candidate target IN (e.g., candidate B) includes: (i) 32 GB DRAM, (ii) 1 CPU with 32 cores, (iii) 150 GB SSD storage, (iv) 5 GB/s BW with 10 ms latency QoS, (v) a GPU with 10 GB frame buffer, (vi) 16 GB/s BW DPU with 16 GB frame buffer, and (vii) open 8881 and 1521 ports. In this scenario, the recommendation engine may determine that candidate B is an immediate lift and shift target IN, because: (i) both ports are open, (ii) it has 32 GB DRAM (more than 16 GB DRAM), and (iii) it has 150 GB SSD storage (more than 100 GB SSD storage) (even if it may provide similar computation power and a slower network communication with higher number of network hops).

Based on the above-described two scenarios, the recommendation engine selects candidate B as the immediate lift and shift target IN because (i) it includes the same (or more) memory and storage comparing to those of the source IN, and (ii) its ports are open. Even though candidate B may provide a slower network communication (e.g., even though it is not the best IN to migrate App. L), as long as App. L can serve the requesting entity and can communicate with Apps. K and M, App. L can be migrated to candidate B because, for example, opening a port in a firewall may take a month. At a later point in time, after migrating App. L to candidate B, the requesting entity may make modifications on candidate B, or may request the recommendation engine to find another, more suitable target IN.

In Step 322, as a result of the determination in Step 320 being YES, the recommendation engine generates a first migration recommendation specifying, for example, "candidate B is the immediate lift and shift target IN (e.g., the selected target IN)". In one or more embodiments, the recommendation may further specify, for example (but not limited to): a name of an environment where a selected target IN is deployed, an IP address of a selected target IN, etc.

In Step 324, the recommendation engine sends the first migration recommendation to the clients (or to another entity, which manages migration processes within the distributed system). The clients may then notify, via a graphical user interface (GUI), the requesting entity about the first migration recommendation.

In one or more embodiments, the GUI may be displayed on a display of the computing device (e.g., 500, FIG. 5) using functionalities of a display engine (not shown), in which the display engine is operatively connected to the computing device. The display engine may be implemented using hardware, software, or any combination thereof. The notification generated by the recommendation engine may be displayed in any visual format that would allow the requesting entity to easily comprehend (e.g., read and parse) the listed information.

Based on the first migration recommendation, the requesting entity may decide to initiate a migration process of App. L from the source IN to the selected target IN. For example, based on the requesting entity's decision, the requesting entity sends an "urgent migration request" to the clients. Based on receiving the urgent migration request, the clients sends the urgent migration request to IN A. IN A may then migrate App. L (and the data stored in it) to the selected target IN using a high priority network slice of the network. Once the migration process is completed, IN A may notify the clients, which may then notify, via the GUI, the requesting entity about completion of the migration process.

In one or more embodiments, the notification may indicate whether the migration process was completed within a projected migration window (discussed below) or whether the migration process was completed after exceeding the projected migration window.

In one or more embodiments, for example, if IN A determines that the network does not include any high priority network slice, IN A may make an API call to a network function module (not shown) of the network to request generation of a high priority network slice. Based on receiving the API call from IN A, the network function module may generate the high priority network slice. The network function module may then notify IN A about completion of the generation of the high priority network slice. After receiving the notification, IN A may migrate App. L to the selected target IN using the high priority network slice.

In one or more embodiments, the network may include, for example (but not limited to): a low priority network slice, a high priority network slice, etc. For example, consider a scenario in which the network has a low priority network slice and a high priority network slice. In this scenario, the network may allocate the same amount of BW to the high priority network slice and to the low priority network slice. If the network supports a 10 GB/s BW with 5 ms latency QoS network capacity, the network function module may allocate a 5 GB/s BW with 30 ms latency QoS network capacity to each of the network slices.

In order to transmit urgent data, the network function module may allocate more network capacity to the high priority network slice than the low priority network slice. Using the example discussed above as a reference, the network function module may allocate a 7 GB/s BW with 15 ms latency QoS network capacity to the high priority network slice and a 3 GB/s BW with 35 ms latency QoS network capacity to the low priority network slice.

As used herein, a "BW" of a network slice may refer to a volume of data that can be transmitted over the network slice in a transmission window. A transmission window may be a period of time, with a definite start and end, within which a data transmission is set to be completed.

In one or more embodiments, the clients may monitor a status (e.g., a currently active or completed status) of the migration process. The status of the migration process may specify information such as: (i) the migration process was successful and the migration process was completed within the projected migration window (e.g., 100% of the migration process was completed), or (ii) the migration process was unsuccessful and the migration process was not completed within the projected migration window (e.g., 80% of the migration process was completed and 20% of the migration process was not completed). In one or more embodiments, the projected migration window may be a period of time, with a definite start and end, within which a migration process is set to be completed.

In one or more embodiments of the invention, the method may end following Step 324.

In Step 326, as a result of the determination in Step 320 being NO and based on the query responses, the recommendation engine selects one or more target INs among other INs. For example, the recommendation engine selects three candidate target INs, in which each candidate includes the following configuration and functionalities: (a) candidate X: (i) 64 GB DRAM, (ii) 2 CPU with 32 cores, (iii) 200 GB SSD storage, (iv) 50 GB/s BW with 1.5 ms latency QoS, (v) a GPU with 20 GB frame buffer, (vi) 32 GB/s BW DPU with 32 GB frame buffer, (vii) 8 (out of 10 required) open ports (including the ports 8881 and 1521), (viii) a functionality to reduce the connection establishment time (CET) between App. K and App. M by 5 seconds, (ix) a functionality to include redundant network-enabled subcomponents, and (x) $25,000 more migration and licensing cost (compared to the source IN's previous migration and licensing cost), (b) candidate Y: (i) 16 GB DRAM, (ii) 1 CPU with 16 cores, (iii) 120 GB SSD storage, (iv) 10 GB/s BW with 5 ms latency QoS, (v) a GPU with 10 GB frame buffer, (vi) 16 GB/s BW DPU with 16 GB frame buffer, (vii) 8 (out of 10 required) open ports (including the ports 8881 and 1521), (viii) a functionality to include redundant network-enabled subcomponents, and (ix) $5,000 more migration and licensing cost (compared to the source IN's previous migration and licensing cost), and (c) candidate Z: (i) 32 GB DRAM, (ii) 1 CPU with 16 cores, (iii) 100 GB SSD storage, (iv) 20 GB/s BW with 3 ms latency QoS, (v) a GPU with 10 GB frame buffer, (vi) 16 GB/s BW DPU with 16 GB frame buffer, (vii) 10 (out of 10 required) open ports (including the ports 8881 and 1521), (viii) a functionality to include redundant network-enabled subcomponents, and (ix) $10,000 more migration and licensing cost (compared to the source IN's previous migration and licensing cost). The aforementioned example is not intended to limit the scope of the invention.

In Step 328, the recommendation engine obtains, from the requesting entity, a weight (e.g., a coefficient) for each inferred parameter in the target IN configuration template. For example, if the requesting entity wants to minimize migration and licensing cost (e.g., giving more value to "cost" factor), then the obtained weights for the parameters may specify: 0.4×cost, 0.2×open ports, 0.15×storage, 0.15×memory, 0.0167×CPU, 0.0167×GPU, 0.0167×DPU, 0.0167×faster network communication, 0.0167×reduced CET, and 0.0167×reliable network connection.

As yet another example, if the requesting entity wants to receive response(s) on time (e.g., giving more value to "reliable network connection", "open ports", "faster network communication", and "reduced CET" factors), then the obtained weights for the parameters may specify: 0.033×cost, 0.2×open ports, 0.033×storage, 0.033×memory, 0.033×CPU, 0.033×GPU, 0.033×DPU, 0.2×faster network communication, 0.2×reduced CET, and 0.2×reliable network connection. The aforementioned examples are not intended to limit the scope of the invention.

Turning now to FIG. 3.3, the method shown in FIG. 3.3 may be executed by, for example, the above-discussed recommendation engine. Other components of the distributed system (100) illustrated in FIG. 1 may also execute all or part of the method shown in FIG. 3.3 without departing from the scope of the invention.

In Step 330, based on the weights (obtained in Step 328), the recommendation engine executes a multiple linear regression model to obtain a deviation score for each of the selected target INs (e.g., for each of the candidate target INs). As an extension of a "linear regression model", the "multiple linear regression model" refers to a statistical method that is used to predict the outcome of a variable based on a value of one or more variables. The variable that needs to be predicted is known as the "dependent" variable, while the variables that are used to predict the dependent variable are known as "independent" or "explanatory" variables.

For example, if the requesting entity is giving more value to the "cost" factor, the recommendation engine generates, based on the corresponding weights and the model, the following equation (e.g., equation one): deviation score (e.g., the dependent variable)=0.4×cost+0.2×open ports+0.15×storage+0.15×memory+0.0167×CPU+0.0167×GPU+0.0167×DPU+0.0167×faster network communication+0.0167×reduced CET+0.0167×reliable network connection (e.g., the independent variables). By incorporating each candidate target IN's configuration and functionality into equation one and executing the model, the recommendation engine obtains the following deviation scores: (i) candidate X: 55%, (ii) candidate Y: 5%, and (iii) candidate Z: 15%. Based on the obtained deviation score for each candidate, the recommendation engine determines that candidate Y is the suitable target IN to minimize migration and licensing cost.

As yet another example, if the requesting entity is giving more value to the "reliable network connection", "open ports", "faster network communication", and "reduced CET" factors, the recommendation engine generates, based on the corresponding weights and the model, the following equation (e.g., equation two): deviation score=0.033×cost+0.2×open ports+0.033×storage+0.033×memory+0.033×CPU+0.033×GPU+0.033×DPU+0.2×faster network communication+0.2×reduced CET+0.2×reliable network connection. By incorporating each candidate target IN's configuration and functionality into equation two and executing the model, the recommendation engine obtains the following deviation scores: (i) candidate X: 5%, (ii) candidate Y: 45%, and (iii) candidate Z: 25%. Based on the obtained deviation score for each candidate, the recommendation engine determines that candidate X is the suitable target IN to receive response(s) on time.

In one or more embodiments, for example, if two candidates (e.g., candidate Y and candidate Z) have the same deviation score for the "cost" factor, the recommendation engine may consider the geographical location of each candidate. Assume here that the requesting entity resides in India. If candidate Y resides in India and candidate Z resides in Germany, the recommendation engine may select candidate Y as the suitable target IN. Additionally, the recommendation engine may select both candidates as the suitable target INs in order to recommend more options to the requesting entity. Thereafter, the requesting entity may decide which candidate should be the target IN. The aforementioned examples are not intended to limit the scope of the invention.

In Step 332, based on the deviation scores (obtained in Step 330), the recommendation engine generates a second migration recommendation specifying one of the selected target INs as the suitable target IN. For example, if the requesting entity is giving more value to the "cost" factor, the recommendation may specify "candidate Y is the suitable target IN". In one or more embodiments, the recommendation may further specify, for example (but not limited to): a name of an environment where a suitable target IN is deployed, an IP address of a suitable target IN, etc.

In Step 334, based on the deviation score of the recommended target IN, the recommendation engine determines one or more deficiencies of the recommended target IN. Referring to the deviation scores obtained in Step 330, for example, if candidate Y is the recommended target IN, the recommendation engine may determine the deficiencies as "two missing ports" and "same amount of memory as the source IN". As yet another example, if candidate X is the recommended target IN, the recommendation engine may determine the deficiency as "two missing ports".

In Step 336, based on a support history, the recommendation engine determines how much time is required to overcome the deficiencies (determined in Step 334). For example, for the "two missing ports" deficiency, the recommendation engine may determine "two months" as the required amount of time to overcome this deficiency. As yet another example, for the "same amount of memory as the source IN" deficiency, the recommendation engine may determine "two days" as the required amount of time to overcome this deficiency.

In one or more embodiments, the recommendation engine may obtain the support history from a support database. In one or more embodiments, the support history may be, for example (but not limited to): a service level agreement, an existing knowledge base article, a port's user guide, a port's release note, a community forum question and its associated answer, a user posted approximate port activation time, etc.

In Step 338, the recommendation engine sends the second migration recommendation, the deficiencies, and the required time to overcome those deficiencies (as a message) to the clients (or to another entity, which manages migration processes within the distributed system). The clients may then notify, via the GUI, the requesting entity about the message.

For example, if candidate Y is the recommended target IN, the message may specify: (i) candidate Y is the suitable target IN, (ii) candidate Y has two missing ports (e.g., the first deficiency) and has the same amount of memory as the source IN (e.g., the second deficiency), and (iii) two months is needed to overcome the first deficiency and two days is needed to overcome the second deficiency.

As yet another example, if candidate X is the recommended target IN, the message may specify: (i) candidate X is the suitable target IN, (ii) candidate X has two missing ports (e.g., the deficiency), and (iii) two months is needed to overcome the deficiency.

Further, based on the message, the requesting entity may decide to initiate a migration process of App. L from the source IN to the suitable target IN. For example, based on the requesting entity's decision, the requesting entity sends a "migration request" to the clients. Based on receiving the migration request, the clients sends the migration request to IN A. IN A may then migrate App. L (and the data stored in it) to candidate Y using the high priority network slice. Once the migration process is completed, IN A may notify the clients, which may then notify, via the GUI, the requesting entity about completion of the migration process. The aforementioned examples are not intended to limit the scope of the invention In one or more embodiments of the invention, the method may end following Step 338.

Start of Example

The following section describes an example of one or more embodiments. The example, illustrated in FIGS. 4.1-4.3, is not intended to limit the scope of the embodiments disclosed herein and is independent from any other examples discussed in this application.

Turning to the example, consider a scenario in which IN A (412) is deployed into Environment A (410), IN F (432) is deployed into Environment C (430), and IN D (442) is deployed into Environment D (440). Initially, FIG. 4.1 shows a diagram in which each application communicates to each other in order to serve a request received from a user (via a client (not shown)). For the sake of brevity, not all components of Environment A (410), Environment C (430), and Environment D (440) may be illustrated in FIG. 4.1.

Assume here that: (i) IN A (412) includes App. A, (ii) IN F (432) includes App. B, and (iii) IN D (442) includes App. C. Further, assume here that: (i) App. A receives the request from the client through a network (not shown), (ii) App. A communicates with App. B and sends the request to App. B through the network (shown with the first arrow), (iii) App. B communicates with App. C and sends the request to App. C through the network (shown with the second arrow), (iv) App. C communicates back to App. B and provides a response (to the request) to App. B through the network (shown with the third arrow), (v) App. B communicates back to App. A and provides the response to App. A through the network (shown with the fourth arrow), and (vi) App. A communicates back to the client and provides the response to the client through the network.

As indicated, the network communication between App. A and App. B is relatively faster than the network communication between App. B and App. C. More specifically, the request is delivered to App. B in five seconds, whereas the request is delivered to App. C in seven seconds. Consequently, the CET between App. A and App. C is twelve seconds.

At this time, all applications are directed to (e.g., instructed to) provide services to the user from their current environments.

Turning now to FIG. 4.2, FIG. 4.2 shows a diagram of INs at a later point in time, in which the applications could not communicate to each other because of a processing resource failure in IN F (432). Based on that, the recommendation engine (not shown) receives an application migration request for App. B from the client. In response to the application migration request, the recommendation engine obtains distributed logs for Apps. A-C. After obtaining, the recommendation engine executes distributed tracing to process and extract relevant data from the distributed logs. Based on the relevant data, the recommendation engine infers (i) dependencies and connectivity among Apps. A-C, (ii) computing resource details of IN F (432), and (iii) CETs and network connection reliability among Apps. A-C.

The recommendation engine then generates a target IN configuration template based on (i) the inferred dependencies and connectivity among Apps. A-C, (ii) the computing resource details of IN F (432), and (iii) the CETs and network connection reliability among Apps. A-C, in which the target IN configuration template specifies that (a) IN F (432) includes 80 GB SSD and 16 GB DRAM, (b) App. A communicates with App. B using port 1, (c) App. B communicates with App. C using port 2, (d) establishing a TCP session between App. A and App. C took twelve seconds, and (e) App C. is received 100% of the request. Thereafter, the recommendation engine generates a configuration query message including the target IN configuration template and multicasts the message to other INs of the distributed system (not shown), except IN F (432). The recommendation engine then receives configuration query responses from other INs. Based on the query responses, the recommendation engine makes a determination that IN X (482) is the suitable target IN (for on time response delivery) because it has the lowest deviation score (5%), comparing to IN Y (484) and IN Z (490), due to its configuration and functionalities.

As indicated, IN X (482) includes the following configuration and functionalities: (i) 32 GB DRAM, (ii) 150 GB SSD storage, (iii) open port 1 and port 2, (iv) a functionality to reduce the CET between App. A and App. C by 4 seconds, and (v) a functionality to include redundant network-enabled subcomponents. Comparing to IN X (482), (a) IN Y (486) includes: (i) 32 GB DRAM, (ii) 90 GB SSD storage, and (iii) open port 1 and port 2, and (b) IN Z (490) includes: (i) 24 GB DRAM, (ii) 100 GB SSD storage, and (iii) open port 1 and port 2.

At this time, all applications (except App. B) are directed to continue providing their services from their current environments.

Turning now to FIG. 4.3, FIG. 4.3 shows a diagram of INs at yet a later point in time, in which the applications still could not communicate to each other. Following the determination made by the recommendation engine in FIG. 4.2, the recommendation engine generates a migration recommendation specifying "IN X (482) is the suitable target IN". Thereafter, (i) based on the deviation score of IN X (482), the recommendation engine determines one or more deficiencies of IN X (482) and (ii) based on a support history, the recommendation engine determines how much time is required to overcome the deficiencies. The recommendation engine then sends the migration recommendation, the deficiencies, and the required time to overcome those deficiencies (as a message) to the client. The client then notify, via the GUI, the user about the message.

At this time, all applications (except App. B) are directed to continue providing their services from their current environments.

End of Example

Turning now to FIG. 5, FIG. 5 shows a diagram of a computing device in accordance with one or more embodiments of the invention.

In one or more embodiments of the invention, the computing device (500) may include one or more computer processors (512), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing application migration, the method comprising:
inferring dependencies and connectivity among applications executing on a distributed system, wherein the applications are operatively connected through a network;
generating a target infrastructure node (IN) configuration template based on the inferred dependencies and connectivity;
making a determination that a configuration of a target IN does not satisfy the target IN configuration template, wherein an application of the applications executing on the distributed system is executing on an IN, wherein the application is not executing on the target IN, wherein the distributed system comprises the IN and the target IN;

in response to the determination:
  obtaining a weight for each inferred parameter in the target IN configuration template, wherein the inferred parameters comprises the inferred dependencies and connectivity, wherein the weight for each inferred parameter is configured by a user;
  executing, based on the weights, a model to obtain a deviation score for a second target IN;
  generating, based on the deviation score, a migration recommendation specifying the second target IN; and
  initiating a display of the migration recommendation to the user.

2. The method of claim 1, further comprising:
  obtaining a distributed log for each application executing on the distributed system;
  executing distributed tracing to process and extract relevant data from the distributed logs; and
  inferring, based on the relevant data, computing resource details of the IN that hosts the application,
  inferring, based on the relevant data, connection establishment times and network connection reliability among the applications,
  wherein generating the target IN configuration template is further based on the computing resource details of the IN that hosts the application, and the connection establishment times and the connection reliability among the applications.

3. The method of claim 2, wherein the relevant data specifies at least a trace identifier and a span identifier.

4. The method of claim 1, further comprising:
  generating a configuration query message, wherein the configuration query message comprises the target IN configuration template;
  multicasting the configuration query message to a plurality of INs, wherein the plurality of INs comprises the target IN; and
  in response to the configuration query message, receiving at least one configuration query response from the plurality of INs,
  wherein the target IN is determined based on the at least one configuration query response.

5. The method of claim 1, wherein the deviation score is caused, at least in part by, a deficiency of the second target IN, wherein the deficiency is a non-reliable network connection.

6. The method of claim 1, wherein the target IN configuration template specifies at least a minimum computing resource requirement.

7. The method of claim 6, wherein the minimum computing resource requirement specifies at least one selected from a group consisting of a processing resource, a storage resource, a virtualization resource, and a networking resource.

8. The method of claim 1, wherein the target IN configuration template specifies at least a port number and a protocol type associated with the port number.

9. The method of claim 1, wherein the model is a multiple linear regression model.

10. A non-transitory computer readable medium comprising computer readable program code, which when executed by a computer processor enables the computer processor to perform a method for managing application migration, the method comprising:
  inferring dependencies and connectivity among applications executing on a distributed system, wherein the applications are operatively connected through a network;
  generating a target infrastructure node (IN) configuration template based on the inferred dependencies and connectivity;
  making a determination that a configuration of a target IN does not satisfy the target IN configuration template, wherein an application of the applications executing on the distributed system is executing on an IN, wherein the application is not executing on the target IN, wherein the distributed system comprises the IN and the target IN;
  in response to the determination:
    obtaining a weight for each inferred parameter in the target IN configuration template, wherein the inferred parameters comprises the inferred dependencies and connectivity, wherein the weight for each inferred parameter is configured by a user;
    executing, based on the weights, a model to obtain a deviation score for a second target IN;
    generating, based on the deviation score, a migration recommendation specifying the second target IN; and
    initiating a display of the migration recommendation to the user.

11. The non-transitory computer readable medium of claim 10, further comprising:
  obtaining a distributed log for each application executing on the distributed system;
  executing distributed tracing to process and extract relevant data from the distributed logs; and
  inferring, based on the relevant data, computing resource details of the IN that hosts the application,
  inferring, based on the relevant data, connection establishment times and network connection reliability among the applications,
  wherein generating the target IN configuration template is further based on the computing resource details of the IN that hosts the application, and the connection establishment times and the connection reliability among the applications.

12. The non-transitory computer readable medium of claim 11, wherein the relevant data specifies at least a trace identifier and a span identifier.

13. The non-transitory computer readable medium of claim 10, further comprising:
  generating a configuration query message, wherein the configuration query message comprises the target IN configuration template;
  multicasting the configuration query message to a plurality of INs, wherein the plurality of INs comprises the target IN; and
  in response to the configuration query message, receiving at least one configuration query response from the plurality of INs,
  wherein the target IN is determined based on the at least one configuration query response.

14. The non-transitory computer readable medium of claim 10, wherein the deviation score is caused, at least in part by, a deficiency of the second target IN, wherein the deficiency is a non-reliable network connection.

15. The non-transitory computer readable medium of claim 10, wherein the target IN configuration template specifies at least a minimum computing resource requirement.

16. The non-transitory computer readable medium of claim 15, wherein the minimum computing resource requirement specifies at least one selected from a group consisting of a processing resource, a storage resource, a virtualization resource, and a networking resource.

17. The non-transitory computer readable medium of claim 10, wherein the target IN configuration template specifies at least a port number and a protocol type associated with the port number.

18. The non-transitory computer readable medium of claim 10, wherein the model is a multiple linear regression model.

19. A system for managing application migration, the system comprising:
a processor comprising circuitry;
memory comprising instructions, which when executed perform a method, the method comprising:
inferring dependencies and connectivity among applications executing on a distributed system, wherein the applications are operatively connected through a network;
generating a target infrastructure node (IN) configuration template based on the inferred dependencies and connectivity;
making a determination that a configuration of a target IN does not satisfy the target IN configuration template, wherein an application of the applications executing on the distributed system is executing on an IN, wherein the application is not executing on the target IN, wherein the distributed system comprises the IN and the target IN;
in response to the determination:
obtaining a weight for each inferred parameter in the target IN configuration template, wherein the inferred parameters comprises the inferred dependencies and connectivity, wherein the weight for each inferred parameter is configured by a user;
executing, based on the weights, a model to obtain a deviation score for a second target IN;
generating, based on the deviation score, a migration recommendation specifying the second target IN; and
initiating a display of the migration recommendation to the user.

20. The system of claim 19, further comprising:
obtaining a distributed log for each application executing on the distributed system;
executing distributed tracing to process and extract relevant data from the distributed logs; and
inferring, based on the relevant data, computing resource details of the IN that hosts the application,
inferring, based on the relevant data, connection establishment times and network connection reliability among the applications,
wherein generating the target IN configuration template is further based on the computing resource details of the IN that hosts the application, and the connection establishment times and the connection reliability among the applications.

* * * * *